(12) United States Patent
Greene, Jr.

(10) Patent No.: US 11,032,149 B2
(45) Date of Patent: Jun. 8, 2021

(54) CLASSIFICATION AND RELATIONSHIP CORRELATION LEARNING ENGINE FOR THE AUTOMATED MANAGEMENT OF COMPLEX AND DISTRIBUTED NETWORKS

(71) Applicant: Crenacrans Consulting Services, Wilton, NY (US)

(72) Inventor: James W. Greene, Jr., Wilton, NY (US)

(73) Assignee: Crenacrans Consulting Services, Wilton, NY (US)

( * ) Notice: Subject to any disclaimer, the term of this patent is extended or adjusted under 35 U.S.C. 154(b) by 249 days.

(21) Appl. No.: 16/214,421

(22) Filed: Dec. 10, 2018

(65) Prior Publication Data
US 2019/0245754 A1    Aug. 8, 2019

Related U.S. Application Data

(60) Provisional application No. 62/626,594, filed on Feb. 5, 2018.

(51) Int. Cl.
| | |
|---|---|
| *G06F 15/173* | (2006.01) |
| *H04L 12/24* | (2006.01) |
| *G06N 20/00* | (2019.01) |
| *H04L 12/26* | (2006.01) |
| *H04L 29/06* | (2006.01) |

(52) U.S. Cl.
CPC .......... *H04L 41/145* (2013.01); *G06N 20/00* (2019.01); *H04L 41/142* (2013.01); *H04L 43/08* (2013.01); *H04L 67/42* (2013.01)

(58) Field of Classification Search
CPC .............................. H04L 41/142; H04L 43/08
USPC .................................................. 709/223–225
See application file for complete search history.

(56) References Cited

U.S. PATENT DOCUMENTS

| | | | |
|---|---|---|---|
| 6,157,921 A | 12/2000 | Barnhill | |
| 7,318,051 B2 | 1/2008 | Weston et al. | |
| 7,685,077 B2 | 3/2010 | Li et al. | |
| 7,711,751 B2 * | 5/2010 | Kelley | H04L 41/046 707/791 |
| 9,413,779 B2 | 8/2016 | Vasseur et al. | |
| 9,684,705 B1 | 6/2017 | Satish et al. | |

(Continued)

*Primary Examiner* — Duyen M Doan
(74) *Attorney, Agent, or Firm* — Banner & Witcoff, Ltd.

(57) ABSTRACT

The present disclosure describes a method, system, and apparatus for using a machine learning system to configure and optimize complex, distributed computer networks. The machine learning system receives an input related to a computer network and classifies the input using either a supervised learning approach or an unsupervised learning approach. From the classification of the input, the machine learning system builds a first training domain and determines a steady state network configuration for the computer network. After determining a steady state network configuration for the computer network, the machine learning system receives a plurality of inputs from one or more sensors or agents distributed throughout the computer network. The machine learning system compares the plurality of inputs to the steady state network configuration to detect a deviation from the first steady state network configuration. When a deviation from the steady state network configuration is detected, the machine learning system remediates the problem to return the computer network to the steady state network configuration.

27 Claims, 17 Drawing Sheets

(56) References Cited

U.S. PATENT DOCUMENTS

| | | | |
|---|---|---|---|
| 2002/0133721 A1* | 9/2002 | Adjaoute | G06Q 20/4016 726/23 |
| 2014/0337277 A1* | 11/2014 | Asenjo | G06Q 10/06 707/603 |
| 2015/0032752 A1* | 1/2015 | Greifeneder | H04L 41/064 707/738 |
| 2016/0191559 A1* | 6/2016 | Mhatre | G06F 12/14 726/23 |

\* cited by examiner

CLASSIFICATION AND RELATIONSHIP CORRELATION LEARNING ENGINE FOR THE AUTOMATED MANAGEMENT OF COMPLEX AND DISTRIBUTED NETWORKS

CROSS-REFERENCE TO RELATED APPLICATIONS

This application claims priority to U.S. Provisional Application No. 62/626,594, entitled, "Classification and Relationship Correlation Learning Engine for the Automated Management of Complex and Distributed Networks," filed Feb. 5, 2018, the entirety of which is herein incorporated by reference.

BACKGROUND OF THE INVENTION

1. Field of the Invention

The present disclosure generally relates to distributed networks and, more particularly, to the use of learning machines within distributed computer networks to improve network configuration and performance.

2. Description of Related Art

As networks increase in scope and complexity, relationships within and between the nodes of a network also increase in complexity. These relationships become obscured and extremely difficult to observe. This complicates the ability to optimize and efficiently use these networks. Without a complete and accurate model of how the network is performing, the network cannot easily be mapped to its optimal performance. Moreover, complex, distributed networks include hundreds, or even thousands, of parameters and measurements that impact the network's performance and functionality. Many of these parameters are related, directly or indirectly, in that changing one or more parameters impact the performance and functionality of other parameters. These correlations are often not obvious, or worse, may be counter intuitive.

While machine learning has recently been used to great effect in diverse areas to solve complex problems in the manufacturing, finance, healthcare, and information technology fields, machine learning has fallen short in addressing all of the parameters and features, and their interactions and correlations, to accurately model optimal network performance and use predictive modeling to forecast when networks are performing at less than peak performance. Machine learning's failures in network monitoring can be attributed, in part, to the number of machine learning algorithms that can be employed to build the one or more models. Moreover, selecting the correct machine learning algorithm can be further complicated if the data is unrecognizable by the monitoring system, for example, when the data is entered in a raw or unlabeled manner. Furthermore, mathematically modeling a network falls short because complexity and details are lost when complex network environments are generalized by a mathematical representation. In this regard, there is not a single formula, or even a set of formulas, that can completely characterize a network environment.

Thus, there is a technological problem in the field of network monitoring related to using machine learning techniques in complex systems, such as distributed computer networks.

SUMMARY OF THE INVENTION

The present disclosure describes a method, system, and apparatus for using a network monitoring, learning, and management (NMLM) system to configure and optimize complex, distributed computer networks using machine learning techniques. The NMLM system may receive one or more inputs related to a computer network. The NMLM system classifies the input using a machine learning algorithm, such as a supervised learning approach or an unsupervised learning approach. From the classification of the input, the NMLM system builds a first training domain and determines a steady state model of the network configuration for the computer network based, in part, on the first training domain. After determining a steady state model of the network configuration for the computer network, the NMLM system continues to receive a plurality of inputs from one or more sensors or agents distributed throughout the computer network. The NMLM system compares the plurality of inputs to the steady state model of the network configuration to detect a deviation from the first steady state network configuration. When a deviation from the steady state model of the network configuration is detected, the NMLM system determines one or more solutions to remediate the problem to return the computer network to the steady state network configuration using artificial intelligence. In some examples, the NMLM system presents information to a user or system administrator to remediate the deviation from the steady state model of the network configuration.

As part of a feature gathering process, the NMLM system receives a plurality of parameters as input. These parameters are gathered using active gathering techniques, passive gathering techniques, or any combination thereof. As used herein, parameters include any measurable property or defining characteristic of the network. For example, parameters include bandwidth, CPU usage, memory usage, quality of service (QoS) elements, number of dropped packets, etc. In other examples, parameters include applications and services on desktop clients and mobile clients.

In the context of machine learning, a parameter may be referred to as a feature. Accordingly, the NMLM system classifies and labels a plurality of features obtained during the feature gathering process using both supervised and unsupervised machine learning techniques. The NMLM system then correlates the features based on relationships using one or more machine learning techniques. Based on these correlations, the NMLM system builds one or more training domains and, subsequently, uses these one or more training domains to build steady state models for the network under evaluation. According to preferred embodiments, the NMLM system uses various statistical learning techniques to track input features against the steady state model to predict and identify failures in the network's performance using predictive modeling. The NMLM system provides feedback to the network to mitigate network failures and maintain steady state performance. According to some embodiments, the NMLM system may present the network's performance to a user or system administrator visually.

One of the primary advantages the NMLM system of the present disclosure is its ability to learn the network configuration automatically and train itself to identify a steady state network configuration. Furthermore, the NMLM system provides feedback to the network being monitored to create a continuous feedback loop that recognizes the addition of new feature sets and the impact those new feature sets have on the steady state network configuration. This improves the feedback that the NMLM system is able to provide to the target network. Accordingly, the NMLM system can identify relationships between feature sets and training domains that an administrator would not be able to identify and better determine steps to optimize network configuration using the machine learning techniques and artificial intelligence techniques described herein.

BRIEF DESCRIPTION OF THE DRAWINGS

Various embodiments of the invention are disclosed in the following detailed description and accompanying drawings.

DETAILED DESCRIPTION OF THE INVENTION

Figure 1:
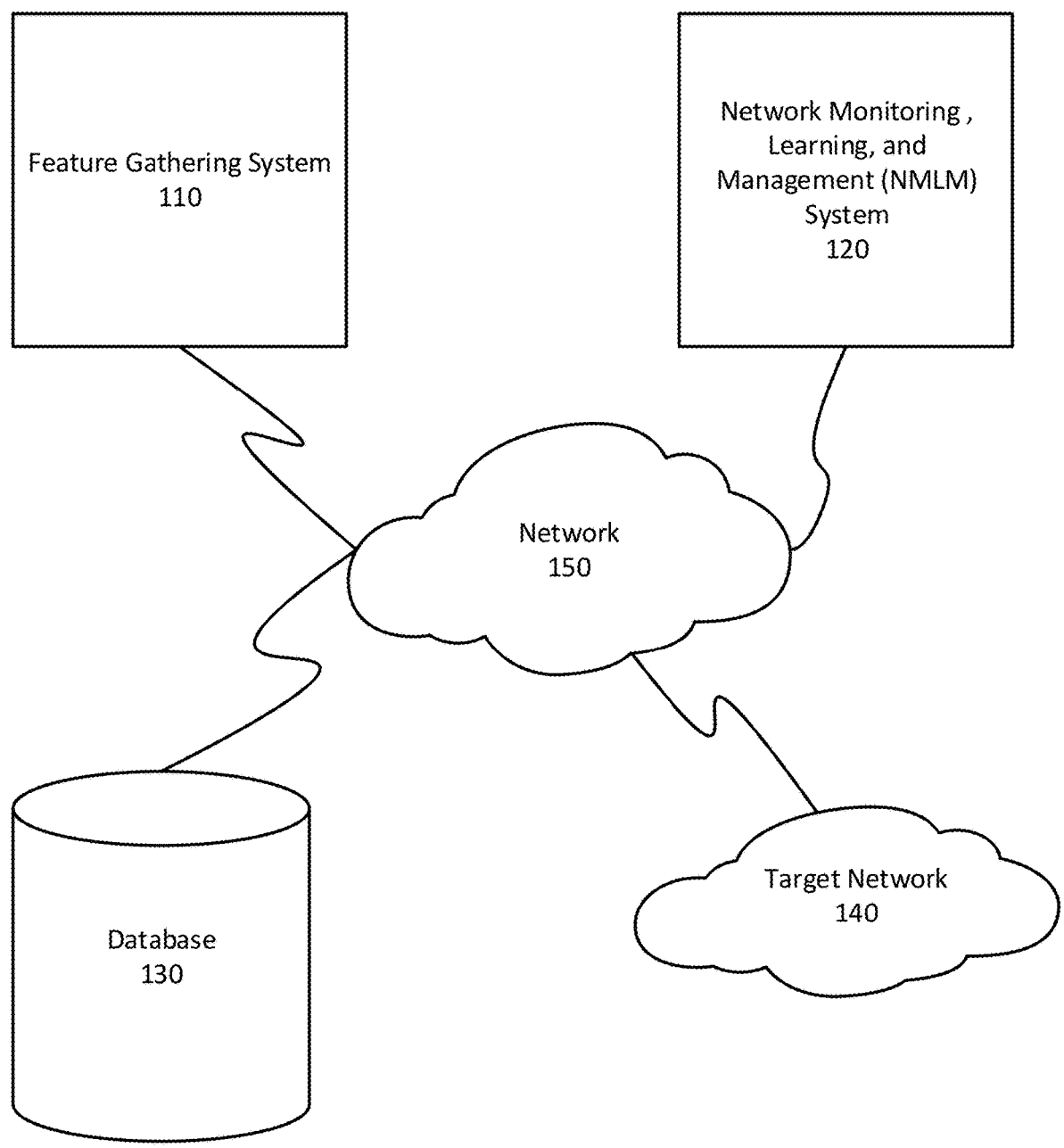
FIG. 1 illustrates an example of a networked system according to one aspect of the disclosure.

The embodiments described herein with reference to the accompanying drawings, in which like reference numerals may refer to identical or functionally similar elements. Further, the terminology used herein is for the purpose of describing particular embodiments only and is not intended to be limiting of the disclosed embodiments. As used herein, the singular forms "a," "an," and "the" are included to include the plural forms as well, unless context clearly defines otherwise. It will be further understood that the terms "comprises" and/or "comprising," when used in the specification, specify the presence of stated features, integers, steps, operations, elements, and/or components, but do not preclude the presence of one or more additional features, integers, steps, operations, elements, and/or groups thereof.

Unless otherwise defined, all terms (including technical and scientific terms) used herein shall be given their plain and ordinary meaning as understood by one of ordinary skill in the art. It will be further understood that terms such as those defined in commonly used dictionaries, should be interpreted as having a meaning that is consistent with their meaning in the context of the relevant art and will not be interpreted in an idealized or overly formal sense unless expressly so defined herein.

The present invention may be embodied as a method, system, and/or as computer program instructions stored on a non-transitory computer-readable medium. Accordingly, the embodiments may take the form of hardware, software, or a combination thereof. Any suitable non-transitory computer-readable medium or processor-readable medium may be utilized including, for example, but not limited to, hard disks, USB Flash Drives, DVDs, CD-ROMs, optical storage devices, magnetic storage devices, etc. The instructions may be written in any suitable programming and/or scripting language, such as Java, C, C++, C#, Python, erlang, PHP, etc.

The disclosed embodiments are described, in part below, with reference to flowchart illustrations and/or block diagrams of methods, systems, computer program products, and data structures according to embodiments of the invention. It will be understood that each block of the illustrations, and combinations of blocks, can be implemented by computer program instructions. These computer program instructions may be provided to a processor of a general-purpose computer, special-purpose computer, or other programmable data processing apparatus to produce a machine such that the instructions, which execute via the processor of the computer or other programmable data processing apparatus, create means for implementing the functions/acts specified in the block or blocks.

Note that the instructions described herein such as, for example, the operations/instructions and steps discussed herein, and any other processes described herein can be implemented in the context of hardware and/or software. In the context of software, such operations/instructions of the methods described herein can be implemented as, for example, computer-executable instructions such as program modules being executed by a single computer or a group of computers or other processors and processing devices. In most instances, a "module" constitutes a software application.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked PCs, tablet computers, remote control devices, wireless handheld devices, Smartphones, mainframe computers, servers, and the like.

The term module, as utilized herein, may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module) and which includes source code or machine code that actually implements the routines in the module. The term module may also simply refer to an application such as a computer program designed to assist in the performance of a specific task such as word processing, accounting, inventory management, etc. Additionally, the term "module" can also refer in some instances to a hardware component such as a computer chip or other hardware.

Alternatively, each block, and/or combinations of blocks, may be implemented by special purpose hardware, software, or firmware operating on special or general-purpose data processors, or combinations thereof. It should also be noted that, in some alternative implementations, the operations noted in the blocks may occur in an order different from the one indicated in the figures. For example, two blocks shown in succession may in fact be executed substantially concurrently, or the blocks may sometimes be executed in the reverse order, or the varying embodiments described herein can be combined with one another or portions of such embodiments can be combined with portions of other embodiments in another embodiment.

As noted above, networks tend to be diverse and unpredictable making it difficult to create consistent and comprehensive models of networks. One technique includes machine learning, which analyzes the features and/or parameters of a network and classifies these features. As used herein, features and/or parameters mean any measurable characteristic that can be observed about any aspect of the network under observation. After classifying these features and/or parameters, machine learning algorithms may be used to correlate and identify relationships between the parameters and/or features of a network. Using the parameters and/or features and their interrelationships, a NMLM system may learn about the network and train the system on how to respond when values related to the features deviate from what is expected. Moreover, machine learning techniques may improve the accuracy of an existing network model, build predictive models of how the network should behave, predict when the network will fail or perform poorly, and build prescriptive models to optimize the network performance without direct human intervention.

FIG. 1 illustrates an exemplary embodiment of the NMLM system according to one embodiment of the present disclosure. FIG. 1 includes a feature gathering system 110, a NMLM system 120, a database 130, and a target network 140 interconnected via a network 150.

Feature gathering system 110 may be one or more servers or a server-based application that is configured to acquire network configuration information and network performance metrics using passive monitoring techniques, active querying techniques, or any combination thereof. According to the example shown in FIG. 1, feature gathering system acquires network configuration information and performance metrics from target network 140 via network 150. The network configuration information and performance metrics obtained from target network 140 are communicated to NMLM system 120 and database 130 via network 150.

NMLM system 120 may be one or more servers or a server-based application that is configured to classify and label features obtained by feature gathering system 110, build a training model of the existing target network 140, determine a steady state model and/or configuration for target network 140, determine a real-time model and/or configuration of target network 140, monitor target network 140 to detect and predict network failures by comparing the real-time model of target network 140 to the steady state model of target 140, and provide feedback to target network 140 to achieve the steady state model and/or configuration. According to some embodiments, feature gathering system 110 and NMLM system 120 are co-located on the same physical server or system. In further embodiments, feature gathering system 110 and NMLM system 120 are co-located on a physical device located on target network 140.

Database 130 may be a relational database capable of storing information about target network 140, including features gathered by feature gathering system 110 and NMLM system 120, the steady state model of target network 140, and the real-time model of target network 140. Accordingly, database 130 is accessible to both feature gathering system 110 and NMLM system 120. This may be accomplished by being communicably coupled to both systems or being co-located on the same physical device as both the feature gathering system 110 and NMLM system 120. In preferred examples, NoSQL repositories, such as MongoDB or Casandra, are used to store the data; however, SQL-based repositories may also be used.

Target network 140 may be a local area network (LAN), a metropolitan area network (MAN), or a wide area network (WAN). According to some examples, target network 140 may be a computer network, such as a network for a division or satellite office of a larger company. In other examples, target network may be a distributed computer network. As used herein, a distributed computer network is one or more computer networks that belong to an entity that are physically, geographically, and/or logically separated from one another.

Network 150 network may include various configurations and use a variety of protocols, including the Internet, World Wide Web, intranets, virtual private networks, local Ethernet networks, private networks using proprietary communication protocols, cellular networks, and/or wireless networks. In some examples, feature gathering system 110, NMLM system 120, and database 130 are all co-located on the same device.

Figure 2:
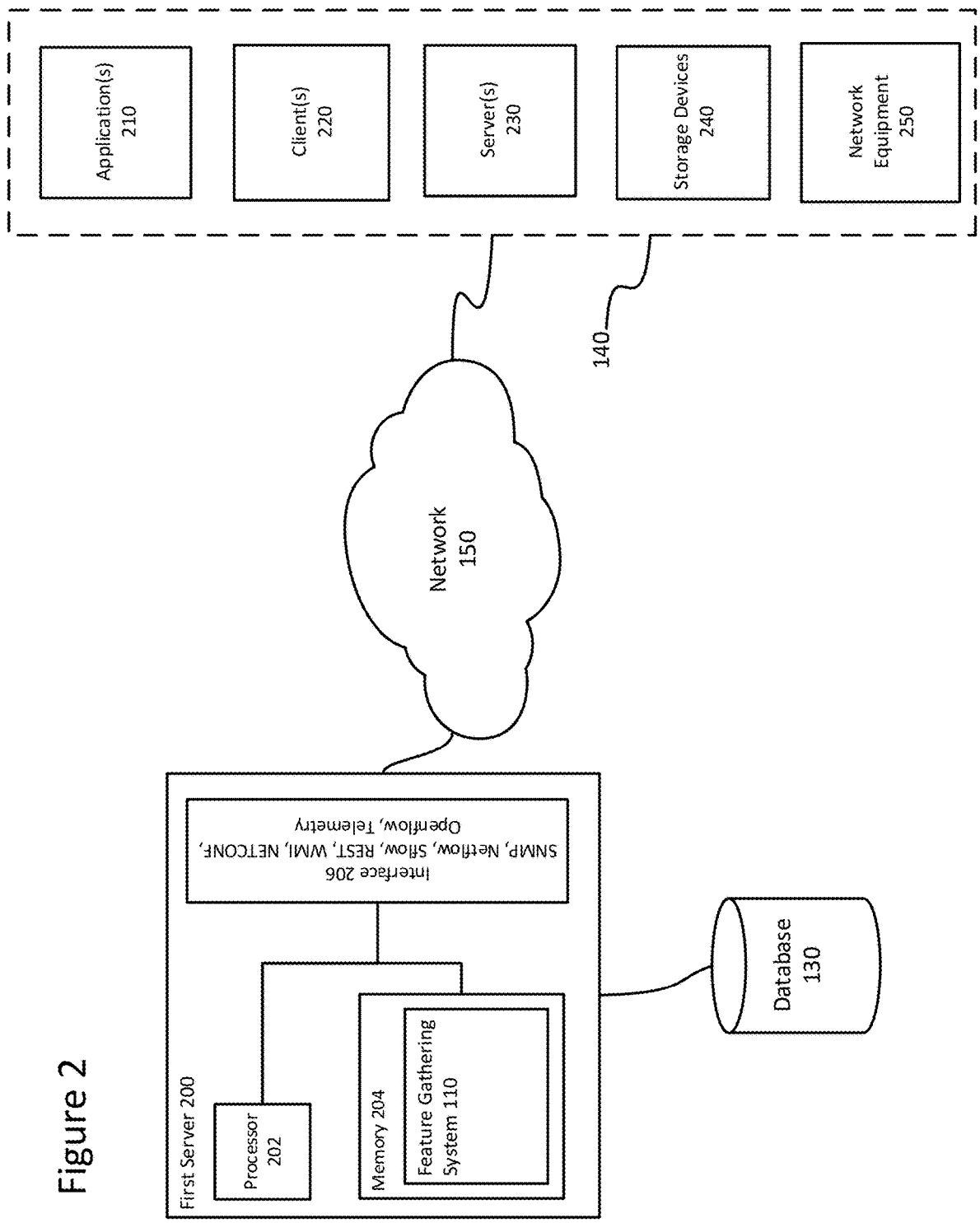
FIG. 2 shows a feature gathering system according to another aspect of the disclosure.

FIG. 2 illustrates a feature gathering system 110 that acquires features from one or more nodes in the target network 140. As used herein, nodes include client devices—such as mobile devices, handheld devices, tablet computers, laptop computers, smart devices, smart phones, desktop computers, and similar devices; servers; and networking equipment. As noted above, feature gathering system 110 is located on a first server 200 and is communicatively coupled to first database 130 and target network 140 via network 150. As illustrated in FIG. 2, target network 140 includes one or more applications 210, one or more clients 220, one or more servers 230, one or more storage devices 240, and one or more network equipment 250. In preferred embodiments, feature gathering system 110 is part of target network 140, allowing target network 140 to monitor and manage itself.

First server 200 includes a processor 202, memory 204, and at least one interface 206 configured to obtain raw data about target network 140. As used herein, "raw data" means any data received by feature gathering system 110 and/or NMLM system 120 in the same format as when it was transmitted by a node; no manipulation and/or modification has occurred. Raw data further means that the system needs to perform further analysis to determine what the data represents and how to best classify the data as features the system understands. First server 200 may be a stand-alone server, a corporate server, one of a plurality of servers configured to acquire features from one or more nodes in the distributed system, a server located in a server farm, or a cloud-computer environment. In some embodiments, first server 200 may be a cloud-service provider running a virtual machine configured to analyze third party networks. Processor 202 may be any processor capable of interacting with memory 204, at least one interface 206, and first database 130. In this regard, processor 202 may include one or more processors, multiprocessors, multicore processors, or any combination thereof. Alternatively, processor 202 may be a dedicated controller, such as an Application Specific Integrated Circuit (ASIC) or Field Programmable Gate Array (FPGA). In operation, processor 202 execute data and instructions, including instructions to perform the functionality of feature gathering system 110. Memory 204 stores information accessible by processor 112, including instructions and data that may be executed or otherwise used by processor 202 to perform the functionality set forth herein. Memory 204 may be any type of media capable of storing information accessible by processor 202, including a non-transitory computer-readable medium or any other suitable medium that stores data that may be read with the aid of an electronic device, such as a hard-drive, solid state drive, memory card, flash drive, ROM, RAM, DVD, or other optical disks, as well as any other write-capable and read-only memories. Memory 204 may include short term or temporary storage, as well as long-term or persistent storage. In some embodiments, memory 114 may include a storage area network (SAN) accessible by feature gathering system 110. The at least one interface 206 may include one or more application programming interfaces (API) or web interfaces that obtain raw data in a variety of forms, including real-time telemetry, SNMP, REST API, etc. According to some embodiments, feature gathering system 110 uses the at least one interface 206 located on first server 200 to obtain features and data associated with target network 140.

Database 130 may be a relational database capable of storing features and raw data obtained via interface 206. In some examples, database 130 may be configured to store large amounts of data. Preferably, NoSQL repositories, such as MongoDB or Casandra, are used to store the features and/or raw data; however, SQL-based repositories may also be used. As noted above, database 130 is populated with features and raw data acquired, via the at least one interface 206, from one or more applications 210, one or more clients 220, one or more servers 230, one or more storage devices 240, and one or more network equipment 250 via network 150. One or more applications 210 may include productivity applications (e.g., Word, Excel, PowerPoint), distributed applications, server-based applications, web-based applications, cloud-based applications, communication tools, etc. One or more clients 220 may include desktop computers, laptop computers, handheld devices (e.g., smart phones, cellular phones, tablets), printers, scanners, fax machines, multifunction peripherals (MFPs), internet-capable televisions, teleconferencing systems, sensors, manufacturing equipment, smart devices (e.g. thermostats, light switches, refrigerators, etc.), and software agents configured to monitor a state of a computing device. One or more servers 230 may include application servers, database servers, e-mail servers, and the like. Network equipment 250 includes routers, switches, firewalls, etc. The raw data from the disparate sources may be provided to feature gathering system 110 via network 150. Accordingly, network 150 may include various configurations and use a variety of protocols, including the Internet, World Wide Web, intranets, virtual private networks, local Ethernet networks, private networks using proprietary communication protocols, cellular networks, wireless networks, HTTP, SMTP, SNMP, Netflow, Sflow, RESTAPI, WMI, NETCONF, Openflow, Telemetry, etc.

Figure 3:
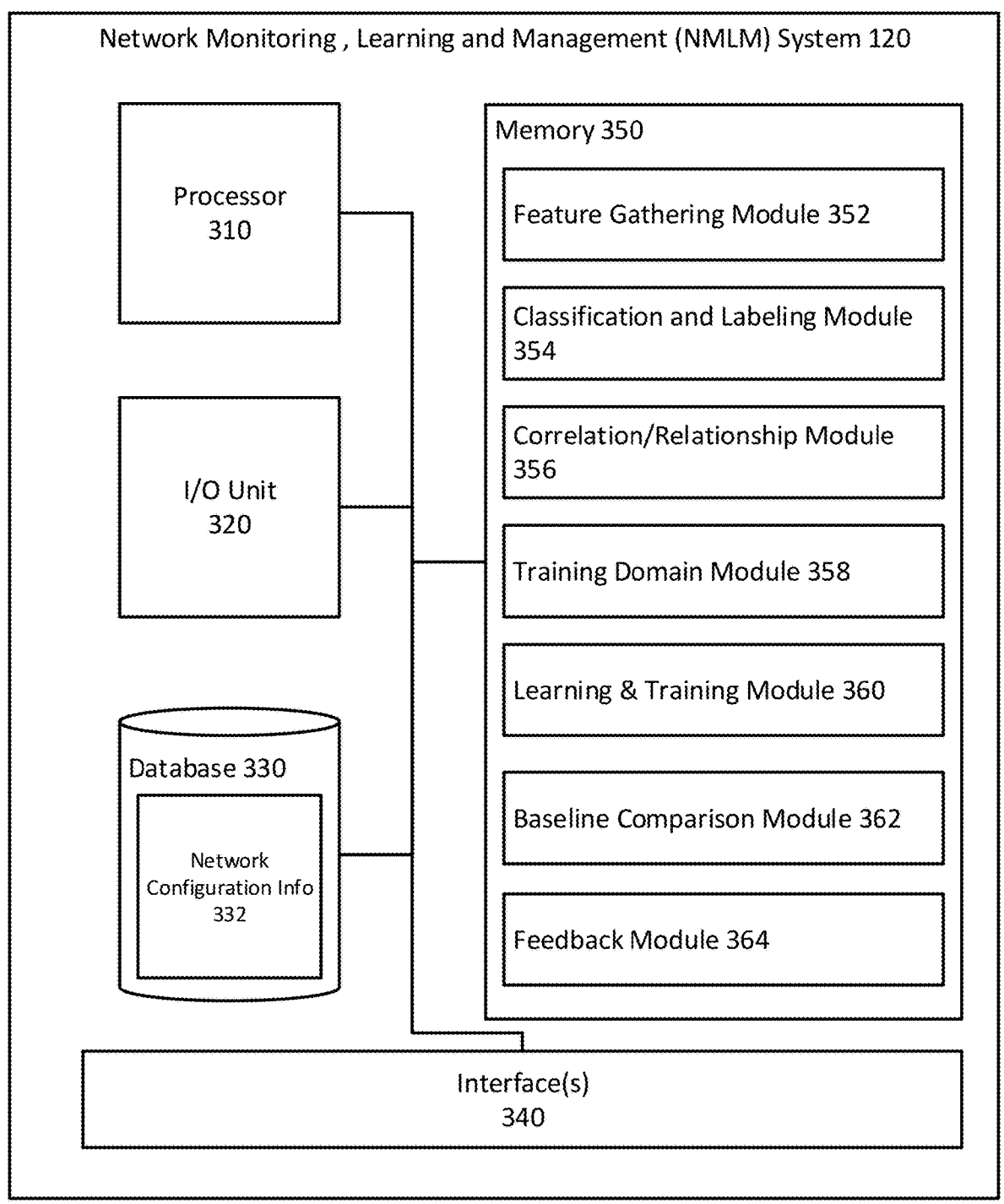
FIG. 3 illustrates a NMLM system according to one example of the disclosure.

After acquiring features and raw data from target network 140, NMLM system 120 may begin to monitor target network 140. FIG. 3 illustrates NMLM system 120 according to one aspect of the current disclosure. NMLM system 120 includes a processor 310, an input/output (I/O) unit 320, a database 330, one or more interfaces 340, and a memory 350. Processor 310 may include any of the processors described above with respect to the first server 200. As will be described in greater detail below, processor 310 may be configured to build training models from features and raw data acquired from target network 140, compare current network conditions to optimal network conditions, render determinations regarding network configurations to return network conditions to a steady state, and provide one or more instructions to network components to bring network conditions back to a steady state. I/O unit 320 may include any of a plurality of peripheral devices designed to receive input from and provide output to a user, including a key board input, a mouse input, a trackpad input, a touch screen display, a monitor output, a printer output, etc. According to some embodiments, I/O unit 320 receives user input indicating the desired performance of the target network and/or system. This input may target specific nodes or communications as having a higher priority than other nodes and/or communications, introduce specific business process requirements, and define other performance requirements, such as time to complete particular tasks. Database 330 may be a memory configured to store information accessible by processor 310, including instructions and data that may be executed or otherwise used by processor 310 to perform the functionality set forth herein. In some examples, database 330 may include network configuration information 332, including a network configuration of a target network, the steady state network configuration for target network 140, one or more models to determine the steady state configuration of target network 140, and one or more real-time models of target network 140. In some examples, database 330 and database 130 (described above) are the same database. NMLM system 120 also includes one or more interfaces 340 for communicating with target network 140, feature gathering system 110, and various databases. The one or more interfaces 340 may include one or more application programming interfaces (API) or web interfaces that obtain data in a variety of forms, including real-time telemetry, SNMP, REST API, etc.

Similarly, memory 350 may be any media described above. Additionally, memory 350 also includes a feature gathering module 352, a classification and labeling module 354, a correlation/relationship module 356, a training domain module 358, a learning/training module 360, a baseline comparison module 362, and at least one feedback module 364.

Data gathering module 352 is configured to receive features and raw data collected by the feature gathering system 110 and stored in the database 130. Accordingly, feature gathering module 352 may include one or more interfaces for retrieving information from database 130. Alternatively, feature gathering module 352 may be configured to perform the functionality of the feature gathering system described above. In preferred embodiments, I/O unit 320 receives input indicating the desired user experience, such as quality of service parameters, priority for certain applications, etc. I/O unit 320 passes the input to data gathering module 352 and classification and labeling module 354 for further processing Classification and labeling module 354 is configured to classify the features and raw data received from the feature gathering module 352 and inputted by a user via I/O unit 320. According to some examples, classification and labeling module 354 is configured to use machine learning methods to identify the specific features represented by the raw data and user input. Additionally, classification and labeling module 354 is configured to recognize features that have been labeled and are recognizable to NMLM system 120. According to these examples, classification and labeling module 354 will automatically classify and label the features appropriately. In further examples, classification and labeling module 354 may be configured to identify optimal values for the received features and raw data, which allows the classification and labeling module 354 to define maximum and minimum thresholds for each feature. These maximum and minimum threshold values are important when defining relationships since the values help to define how changing a first feature can impact one or more second features.

Correlation/relationship module 356 is configured to utilize various feature selection and reduction techniques, as well as behavioral algorithms, to observe how features change over time and how the features may follow or lead another feature behavior. The most obvious relationships are grouped and a composite model may be created. The composite model becomes a new feature that can be compared against other features that have weaker relationships but still exhibit some form of correlation to other features that were used to generate the composite model. The correlation/relationship module 356 may update the composite model at regular intervals and compare the updated composite model to other features until the composite model reaches a correlation threshold in which behaviors of features not included in the composite model do not exhibit any significant variation. That is, the features not included in the composite model stay within range of the one or more features' minimum and maximum threshold values in response to changes to the composite model. When the composite model reaches this point, the composite model becomes a training domain. By grouping related features into common training domains, the computational requirements of NMLM 120 system are reduced while still providing the necessary level of granularity to identify individual features that require remediation. Thus, training domains accurately monitor and remediate target network 140 while consuming less processing power and computational cycles, thereby improving the overall processing efficiency of NMLM system 120.

Training domain module 358 is configured to continuously monitor the training domains created from the composite models. In this regard, training domain module 358 monitors the training domains to determine if the network environment is altered. For example, nodes and/or other services may be added, removed, or modified that impact the performance of the network. This allows the current baseline state to be modified to optimize performance. Additionally, training domain module 358 identifies anomalous behavior, such as a breach or other security violation. Further, separating features into domains allows new features to be associated with existing domains easier. Moreover, training domain module 358 removes the need to re-define new features whenever there is a change to the network environment, since those new features will be included in training domains automatically.

Learning and training module 360 is configured to build the desired state model for each of the training domains. Learning and training module 360 builds the desired state model for each of the training domains through the use of various machine learning techniques, including supervised, unsupervised, and reinforced machine learning algorithms. Once the desired state models for each of the training domains are built, the one or more desired state models are combined to build a steady state model of target network 140. In preferred embodiments, reinforcement learning may be the primary machine learning technique used due to the real-time, action-response nature of the network environment. In this regard, responses to various actions/prompts create a complete model of the system over time that provides a steady-state or ideal model with maximum and minimum thresholds for acceptable behavior. According to some embodiments, learning and training module 360 uses transfer learning. When one or more features are common to a first training domain and a second training domain, learning and training module 360 transfers knowledge gained from the first training domain to the second training domain. Similarly, knowledge gleaned from the second training domain is transferred to the first training domain. By employing transfer learning, learning and training is optimized. This improves the system's efficiency in recognizing features that are causing anomalous behavior.

Baseline comparison module 362 is configured to compare a real-time model of a network environment (i.e., updated continuously as features and raw data are collected) to the steady state model for the training domain using statistical process control. Baseline comparison module 362 monitors changes in the individual training domains so that if the real-time model deviates by one or more maximum or minimum thresholds, the system can quickly identify the training domains triggering the deviation and work to identify the features within that domain model that are causing the deviation. Once identified, baseline comparison module 362 determines how to remediate the deviation and modifications to return the training domain to the desired state model. In some examples, baseline comparison module 362 provides one or more alerts to a user, such as an administrator, via I/O unit 320. Additionally, baseline comparison module 362 may also provide feedback via feedback module 364 to allow for changes to be made to the target network environment manually or automatically to return the target network environment to the desired steady state model.

Feedback module 364 may include a plurality of feedback systems to improve the machine learning functionality. In preferred embodiments, feedback module 364 includes a system feedback module and a feedback response module. The system feedback module allows for changes to be made to the target network environment that allow the target network environment to return to the desired model state. The feedback response module is configured to monitor the state of the target network environment to determine if the real-time model has moved back to steady-state. If the real-time model is outside acceptable thresholds, the feedback response module will determine if further modifications are needed, either in the initially identified training domain or other training domains as affected.

Figure 4:
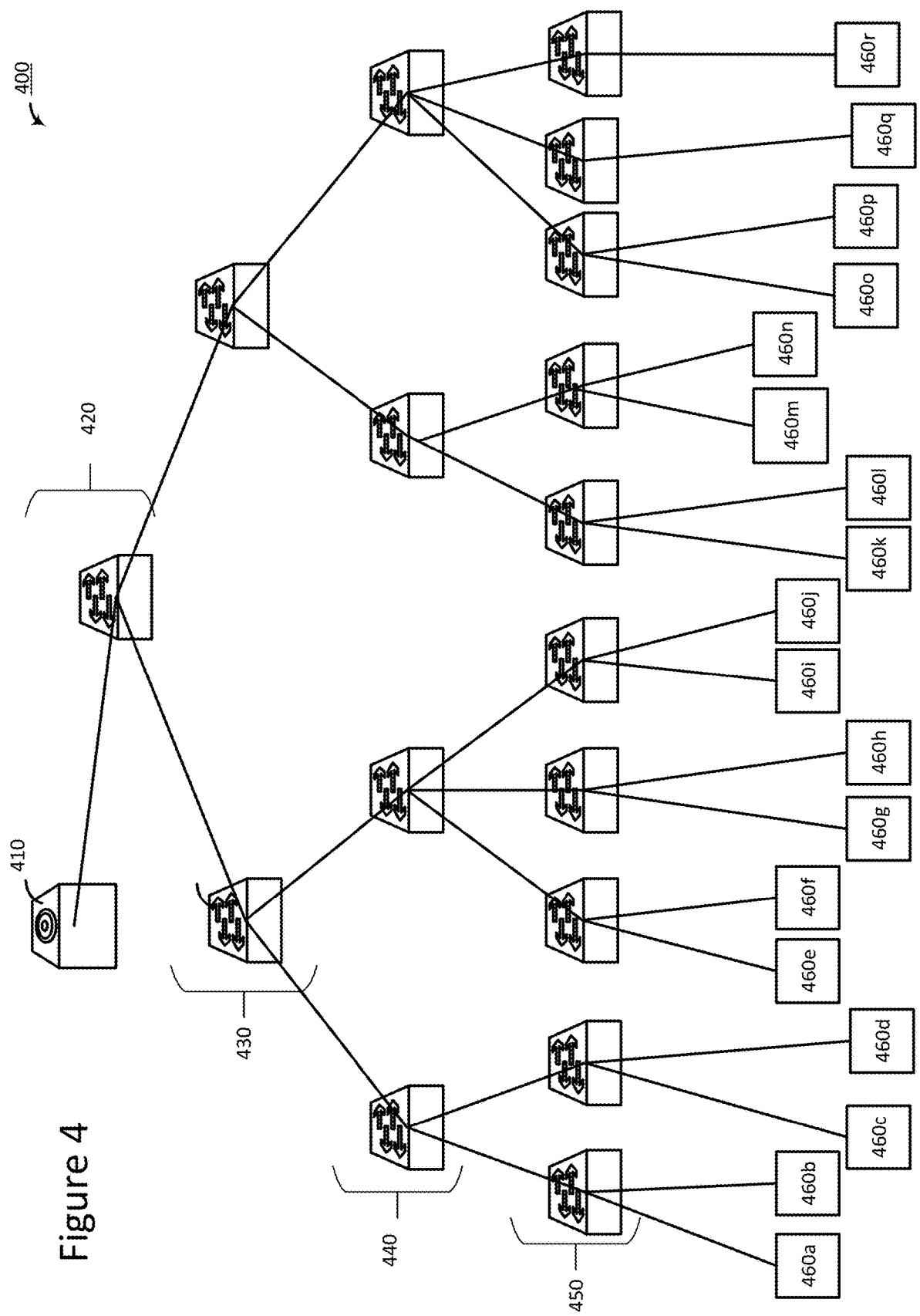
FIG. 4 illustrates an example of a target computer network.

NMLM system 120 is configured to monitor one or more target networks. FIG. 4 illustrates an example of a target network that is monitored by NMLM system 120. In this regard, FIG. 4 includes computer network 400 managed via a central controller 410. According to some examples, NMLM system 120 may be deployed on central controller 410. In addition to central controller 410, computer network 400 includes a first distribution layer 420, a second distribution layer 430, a third distribution layer 440, a fourth distribution layer 450, and a plurality of end points 460a-460r. Computer network 400 shown in FIG. 4 is a binary tree; however, any network configuration may be used, including other tree configurations, as well as spoke-and-hub or ring configurations. Computer network 400 may be a network found in a corporate division, factory, branch office, satellite office, etc. In this regard, computer network 400 may be a physical network, a virtual network, or a combination thereof. Each distribution layer (e.g., 420-450) may represent a plurality of routers, switches, firewalls, Virtual Local Area Networks (VLANs), hypervisors, or other structure configured to route data and information to and from the plurality of endpoints. Endpoints 460a-460r include desktop computers, laptop computers, handheld devices (e.g., smart phones, cellular phones, tablets), printers, scanners, fax machines, multifunction peripherals (MFPs), internet-capable televisions, teleconferencing systems, sensors, manufacturing equipment, smart devices (e.g. thermostats, light switches, refrigerators, etc.), and software agents configured to monitor a state of a computing device.

Central controller 410 may be any type of intelligent device (e.g., router, gateway, firewall, etc.) that is cognizant of computer network 400's configuration. Because central controller 410 is aware of computer network 400's configuration, central controller 410 is capable of coordinating data transfers throughout computer network 400. Additionally, central controller 410 may delegate control, in-part or in whole, to each distribution layer. Similarly, each distribution layer (e.g. 420-450) can provide feedback to central controller 410 to improve network performance. In some embodiments, central controller 410 analyzes the information provided by each distribution layer to determine steady state network configuration and performance. Based on the analysis of the feedback provided by each distribution layer, central controller 410 provides further guidance to each distribution layer to further improve network configuration and performance. Accordingly, each distribution layer has a certain degree of knowledge, but is managed via a central location, specifically central controller 410.

Figure 5:
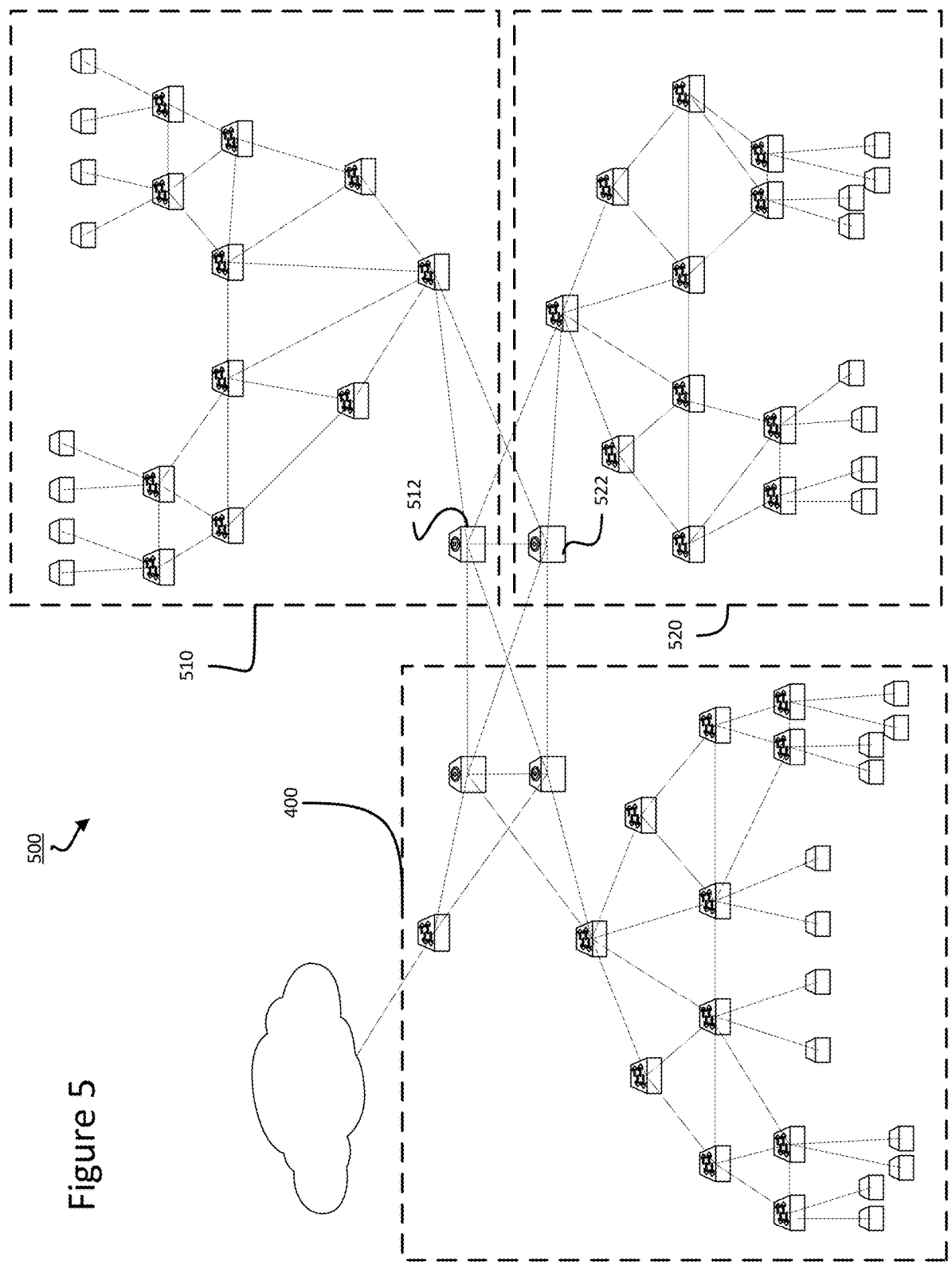
FIG. 5 shows another example of a target distributed compute network.

Computer network 400 may interconnect with a larger network, such as a corporate network. Accordingly, FIG. 5 shows how computer network 400 may interconnect with distributed computer network 500. Distributed computer network 500 illustrates first computer network 400, second computer network 510, and third computer network 520. While only three computer networks are shown in FIG. 5, distributed computer network 500 may include any number of computer networks.

Similar to the first computer network 400 described above, second computer network 510 and third computer network 520 each have a central controller 512 and 522, respectively, configured to manage its respective computer network. As noted above, managing the computer network may include monitoring feedback provided by each distribution layer within the computer network, determining steady state network configuration and performance, and providing instructions to each distribution layer to re-configure the networking and routing devices located therein to achieve the steady state network configuration and performance levels determined by the central controller. Further, the central controller for first computer network 400, second computer network 510, and third computer network 520 are interconnected via backbone network elements and/or other types of dedicated lines.

While a central controller may monitor the performance of each computer network, distributed computer network 500 requires that first computer network 400, second computer network 510, and third computer network 520 cooperate to optimize the performance of distributed computer network 500. As will be discussed in greater detail below, machine learning techniques correlate and train the various networks and components that constitute distributed computer network 500. Specifically, features and raw data from each node in each subset of each network is obtained and correlated into a training domain. Training domains may be established by the first distribution layer of first network 400, second computer network 510, and third computer network 520, which are in regular communication with each other. Accordingly, there may be one or more training domains, which may be configured based upon at least one of geographical proximity, functional equivalency, business process requirements, physical and/or virtual relationships, etc. Alternatively, training domains may be related groupings of features where changes to one or more first features within the feature set may impact one or more second features within the training domain. Affects may be positive or negative, direct or inverse (e.g., doing x improves y). As will be discussed in greater detail below, the NMLM system may learn how one or more first features will impact one or more second features using techniques, such as neural network backpropagation. Features do not have to be unique to an individual training domain, as the training domain defines the relationship between the features instead of the features defining the relationship between the features. For example, a first training domain related to bandwidth delays may be impacted by a second training domain that includes network switching queues and a third training domain involving database queries and responses.

Figure 6:
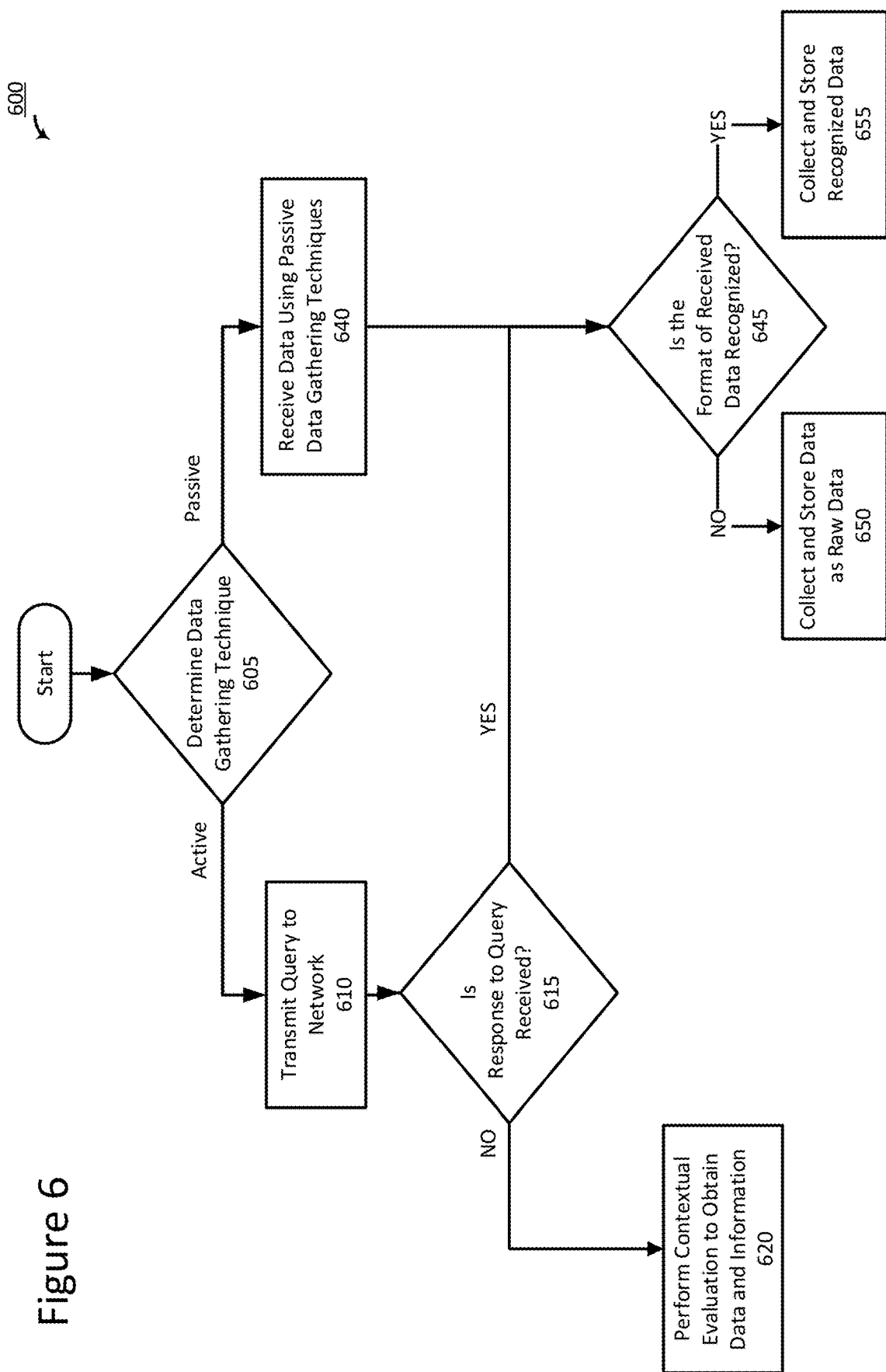
FIG. 6 illustrates an exemplary process for gathering one or more features from a computer network.

Once training domains are defined, another routine of the NMLM system identifies relationships between the training domains to define a desired baseline state for the distributed computer network 500. In order to define the desired baseline state, the NMLM system acquires features and raw data, such as the type of applications being used on the network, the number and type of client devices, the number and type of servers, storage devices, networking equipment, network configuration, network metrics, etc., from one or more nodes in distributed computer network 500. FIG. 6 shows a process 600 for obtaining features from one or more nodes in a distributed computer network.

The feature gathering process contained within the feature gathering module 352 begins in block 605 with the feature gathering process determining whether to use an active or passive feature gathering technique. The determination may be based, in part, on whether traffic associated with the target network is detected. Alternatively, the feature gathering system may determine which feature gathering technique based on preferences set by the administrator of the target network.

When active feature gathering techniques are selected, a query is transmitted to the target network in block 610. In particular, a request for information is transmitted to the one or more devices, nodes, and components of the target network. Accordingly, the feature gathering system may employ one or more network discovery protocols, such as SNMP, REST API, Network Configuration Protocol ("NetConf"), YANG, Java Management Extensions ("JMX"), Windows Management Instrumentation ("WMI"), Nedlow, Sflow, Openflow, Telemetry, etc., to actively learn about the network configuration and various network conditions of the target network.

In block 615, feature gathering system determines if a response to the query has been received. If no such response has been received, feature gathering system performs a contextual evaluation of the target network to obtain features and information about the one or more devices that constitute the target network in block 620. According to one example, contextual evaluation is performed when a security device, such as a firewall, intrusion detection system (IDS), honeypot, etc., is deployed on the target network and restricts the feature gathering system's ability to gather features from the nodes of the target network via direct query. Accordingly, features about a first node may be obtained from one or more second nodes proximately located to the first node to acquire the status and health of the first node. For instance, a firewall cannot be queried directly for security reasons. However, a firewall may be detected via various passive techniques, such as detecting exchange routes with neighboring devices or discovering the firewall via discovery protocols, like Cisco Discovery Protocol (CDP) or link layer discovery protocol (LLDP). Furthermore, the firewall may be detected by analyzing the type of traffic that is allowed to traverse an unknown device. If certain traffic, such as explicit or malicious traffic, is unable to traverse the unknown device, feature gathering system concludes that the unknown device may be a firewall. In another example, an unknown application may not respond to queries from the feature gathering system. Accordingly, the feature gathering system observes with which devices the unknown application communicates and how the unknown application and devices communicate. If the unknown application communicates with a database or includes a web-based front-end, feature gathering system reasonably concludes that the unknown application is a financial application. In yet a further example, feature gathering system modifies one or more features of a known device to observe how the unknown device reacts and responds. For instance, an error message may appear on a device proximately located to the unknown device. Alternatively, one or more components may slow down in response to the one or more modified features. Thus, the reactions and responses of the unknown device, and proximately-located devices, allow feature gathering system to reasonably classify the unknown device. Therefore, the passive data gathering techniques described herein allow feature gathering system to obtain an accurate configuration of the target network and improve the NMLM system's understanding of the target network's configuration and components.

If a response to the feature gathering system's query is received in block 615, feature gathering system determines whether the data included in the response is in a format that is recognized by the feature gathering system in block 645. In this regard, the feature gathering system considers data that can be measured as being in a recognizable format. If the data is not in a format recognized by the feature gathering system, then the data is stored, in the database or other accessible data repository, in a raw data format in block 650. Raw data, in this context, means that the data may be stored without being classified or labeled. However, if the data is in a format recognizable by the feature gathering system, the data is collected and stored in the database, or other appropriate repository, in block 655. Being in a format recognizable by the feature gathering system means the data is in format that has already been defined in the feature gathering system such that the data can be classified and labeled without further analysis. Accordingly, data in a recognizable format does not need to be classified or labeled by data classification module, as discussed in greater detail below.

When feature gathering system determines that a passive data gathering technique should be used, process 600 proceeds to block 640, wherein the feature gathering system receives data using passive data gathering techniques. Data passive gathering techniques may include inspecting network traffic, for example using either a packet sniffer, packet filtering, or deep packet inspection, to obtain data regarding the target network's configuration and performance metrics. In block 645, the feature gathering system determines whether the format of the received data is in a recognizable format. When the data is not in a recognized format, the feature gathering system stores the data in a raw data format in the database or other data repository in block 650. Similarly, recognized data is collected and stored in a database or other data repository in block 655. While active and passive data gathering techniques were described individually, the data gathering process is an iterative process and both active and passive data gathering techniques may be used to acquire information about a target network. This information is used to establish an accurate network configuration of the target network.

Figure 7:
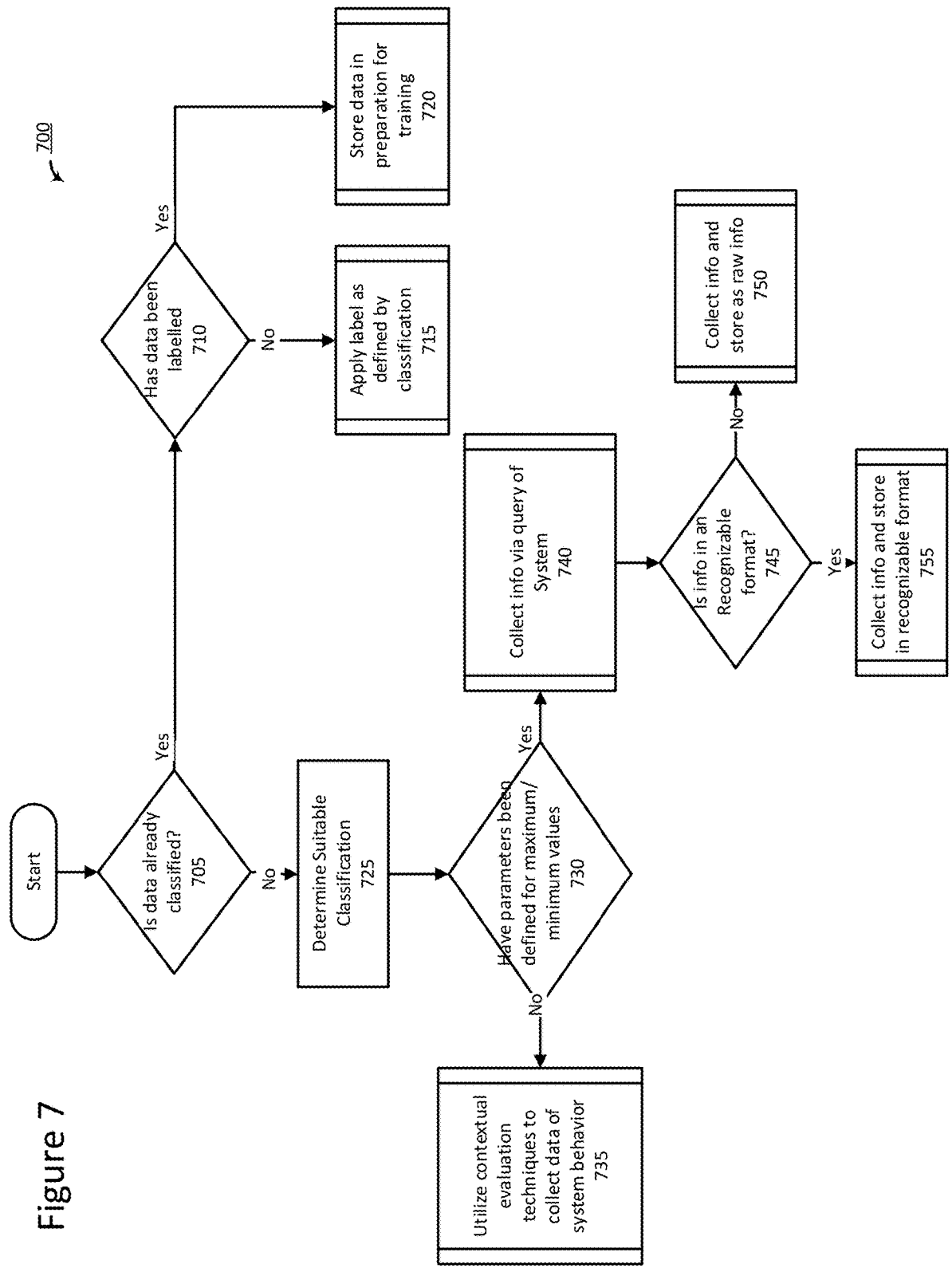
FIG. 7 illustrates an exemplary method for classifying and labelling raw feature data using machine learning techniques.

Upon receiving data from the feature gathering system and user input, NMLM system classifies and labels the received data (i.e., raw data and recognized data). FIG. 7 illustrates an exemplary process 700 for classifying and labeling data acquired by the feature gathering system. In block 705, classification and labeling module 354 determines if the data has been classified and labeled. If the data has already been classified, then the data is passed to block 710 to determine if the data has been labeled. When the data has not been labeled, classification and labeling module 354 applies a label to the received data in block 715. When the data has been labeled, the data is stored, for example in the database or other appropriate data repository, in preparation for training in block 720. As an illustrative example, feature gathering system may provide Voice-over-IP (VOIP) data to the classification and labeling module 354. Accordingly, classification and labeling module 354 classifies the VOIP data as high priority and labels the VOIP data as communication traffic. In another example, feature gathering system provides an HTTP header that includes an "X-Forwarded-For" header to classification and labeling module 354. Classification and labeling module 354 classifies the HTTP header as network traffic and labels the data as proxy traffic, thereby indicating at least one proxy server in the target network.

When data has not been classified, process 700 proceeds to block 725 where the data is evaluated using various techniques, such as support vector machines, neural networks, decision trees, etc., to determine a suitable classification. After determining a suitable classification for the data, classification and labeling module 354 determines an optimal operating range for each piece of data collected in block 730. Determining an optimal operating range includes determining maximum and minimum values for the data. If maximum and/or minimum values have not been set, classification and labeling module 354 utilizes contextual techniques in block 735 to collect additional information to establish maximum and/or minimum values for the data. In this regard, classification and labeling module 354 gathers additional information, such as routing tables, "Reject" or "Deny" messages received based on traffic passing through the node, Round Trip Time (RTT) data, and the like.

If maximum and minimum values have been set, classification and labeling module 354 collects additional information to determine whether the data is within a predetermined range in block 740. The additional information is collected using a variety of techniques, including querying the device directly (e.g., via a command to the target node to obtain a range of acceptable values), observing the device over a period of time, or recognizing standard operating values for the device. In block 745, classification and labeling module 354 evaluates the information received via the query to determine whether the data is in a recognizable format. That is, classification and labeling module 354 reviews the information to ensure that the information is recognizable by the system and fits within expected parameters. If the classification and labeling module 354 fails to recognize the format of the data, the information may be stored as raw information in block 750. As will be discussed in greater detail below, unsupervised machine learning techniques may be used to classify the raw information. The stored information is subsequently classified using machine learning methods, such as unsupervised machine learning techniques. If the classification and labeling module 354 recognizes the format of the information, the information is stored in an appropriate format in block 755.

Figure 8A:
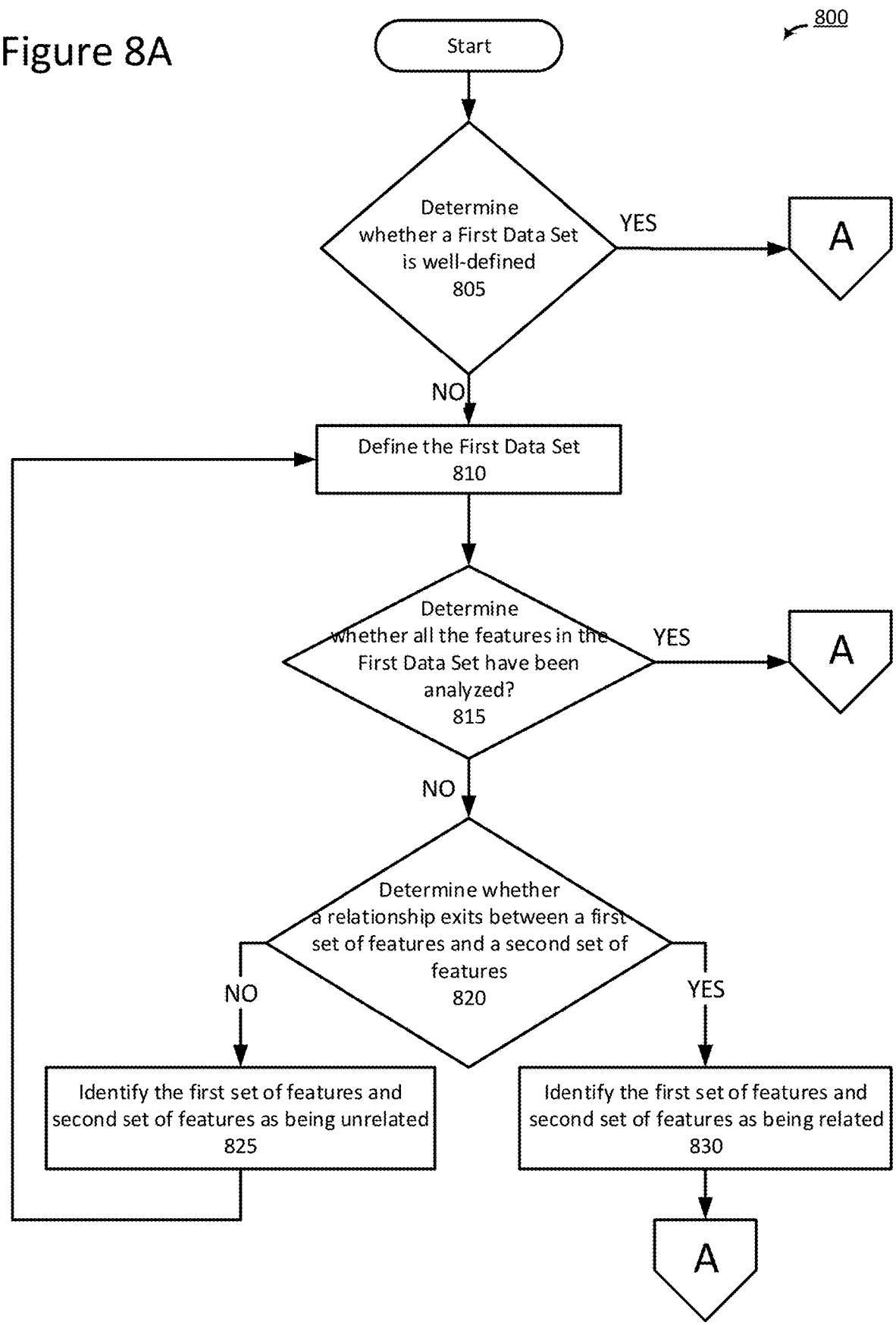
FIGS. 8A and 8B show an exemplary process for correlating and defining relationships of classified and labeled feature data in a machine learning model.
Figure 8B:
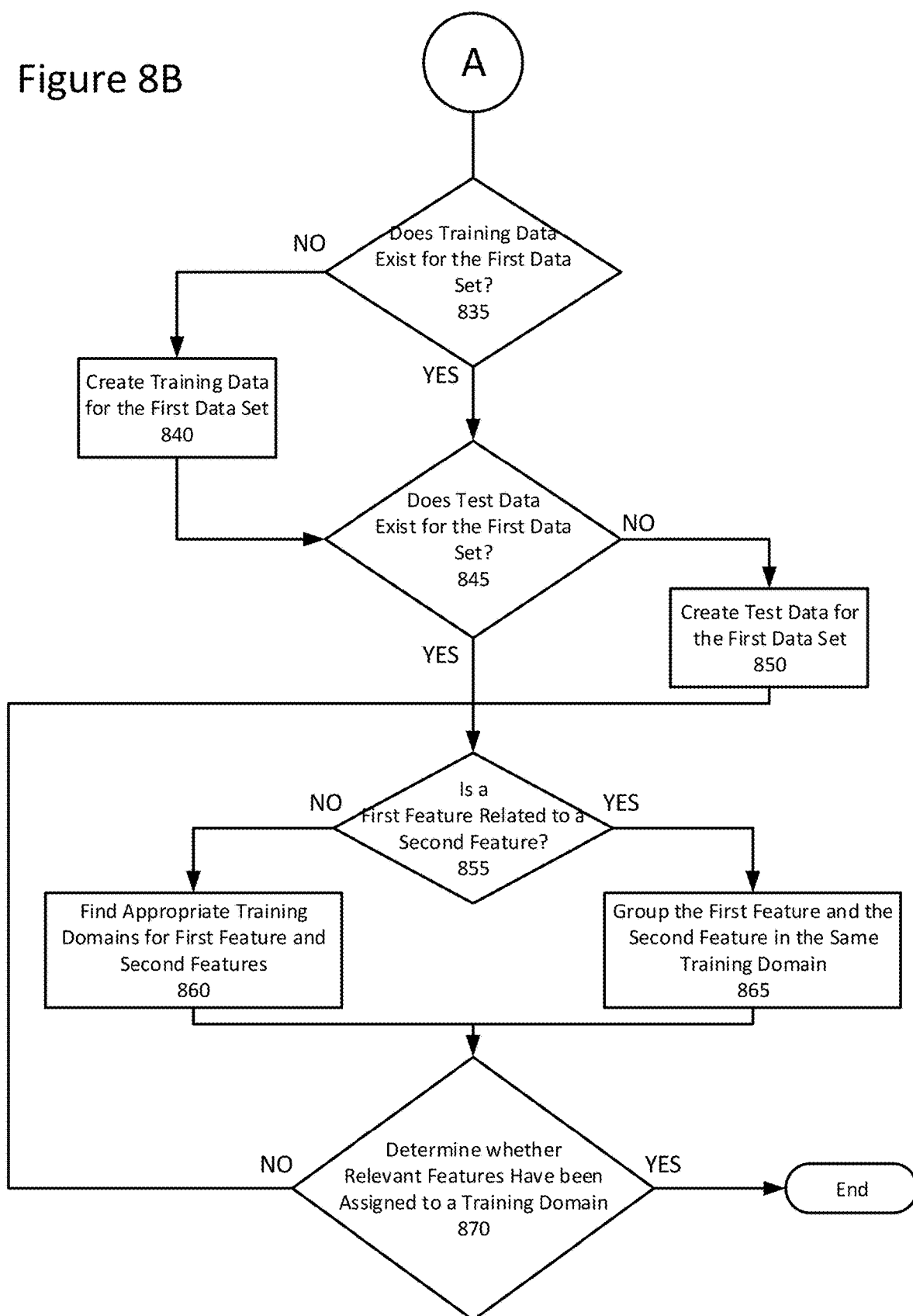

Once data and information are classified and labeled, the NMLM system correlates the data to define a relationship between the various features in a training domain. FIGS. 8A-8B illustrate an exemplary method 800 for correlating data and defining relationships between data sets in a training domain. In block 805, correlation/relationship module 356 determines whether a first data set has been well-defined. The first data set may include features obtained from a single point of origin, such as a node or an application in the target network. In preferred examples, the data set being evaluated includes at least a first set of features and a second set of features. The correlation/relationship module 356 determines whether the first set of one or more features and the second set of one or more features are well-defined based on previous iterations of the correlation and relationship process described herein. If there have been no previous iterations of the correlation and relationship process, correlation/relationship module 356 builds the initial first set of one or more features and the initial second set of one or more features according to a variety of techniques. For example, features may be added to the initial first set of one or more features and the initial second set of one or more features based on the type of source that originated the feature. Alternatively, the initial first set of one or more features and the initial second set of one or more features may be defined by the type of data (e.g., network devices, server data, etc.), geographical location, or manual input of a system administrator. Further, data is well-defined if the correlation/relationship module 356 determines that the first set of features, the second set of features, or any combination of the first set features and the second set of features are relevant to the proper functioning of the network. In other words, correlation/relationship module determines that the first set of features and/or the second set of features impacts the overall performance of the target network. This determination happens as training domains are created, built, and iterated. When the first data set has been well-defined, process 800 proceeds to block 835 (discussed in greater detail below) where the first set of features and second set of features of the first data set are classified in one or more training domains.

When training data has not been previously defined, correlation/relationship module 356 defines the first data set in block 810. Defining the first data set includes performing feature reduction analysis on the first set of features and the second set of features. In preferred examples, feature reduction analysis is performed in accordance with a desired experience input. Feature reduction analysis is a process in which the number of features under consideration are reduced by obtaining a set of principal features. Principal features are identified as those features that directly affect the desired output state of the system, both in observed steady state behavior or user input desired experience. In block 815, correlation/relationship module 356 determines whether every feature and combination of features of the first data set have been analyzed. If every feature and combination of features in the first data set have been analyzed, the process proceeds to block 835, discussed in greater detail below. However, when the correlation/relationship module 356 determines that some feature combinations have not been analyzed, the correlation/relationship module 356 determines whether a relationship between a first set of features and a second set of features exists in block 820. If a relationship does not exist, correlation/relationship module identifies the first set of features and the second set of features as unrelated in block 825. Accordingly, process 800 removes the second set of features from the first data set and returns to block 810 for further evaluation of the features included in the first data set.

When a relationship does exist between the first set of features and the second set of features, correlation/relationship module 356 identifies the first set of features and the second set of features as being related in block 830. In preferred embodiments, determining whether the first set of features and the second set of features are related includes assigning a correlation coefficient to each feature in both the first set of features and the second set of features. A correlation coefficient is a ranking based on a number of factors, including whether the same or similar features are impacted and how much the features are impacted. That is, the correlation coefficient is assigned as a measure of the degree in which the first feature impacts the second feature, and vice versa. The correlation coefficient is a statistical measure, between 0 and 1, that indicates the relationship between two or more features are. A more direct and signification relationship is shown between the two or more features as the correlation coefficient approaches 1. The correlation/relationship module 356 groups features with similar correlation coefficients into a training domain.

In block 835, correlation/relationship module 356 determines whether training data exists for the first data set. If training data does not exist, process 800 proceeds to block 840, where training data is created for the first data set. In preferred embodiments, training data is created by randomly taking a percentage of the existing data, preferably between 65% to 85% of the total data from the first data set. The remaining 15% to 35% of data becomes test data. Accordingly, correlation/relationship module 356 determines whether test data exists in block 845. When test data does not exist, test data is created for the first data set in block 850. The training data is used in later processes to build the relationships between various features; test data is used to validate those relationships.

In block 855, correlation/relationship module 356 determines whether a first feature and a second feature are related. In preferred embodiments, determining whether the first and second features are related includes assigning a correlation coefficient to each feature. Additionally, a first feature and a second feature are related when a first correlation coefficient of the first feature impacts the correlation coefficient of the second feature changes in a consistent manner. For example, there is an inverse relationship between the two features throughput and response time on a network. If throughput increases response time decreases and vice versa. Features that are determined to be related are placed in the same training domain in block 865. If the correlation/relationship module 356 determines that the first feature and the second feature are not related, correlation/relationship module 356 finds the appropriate training domain for the first feature and the second feature in block 860. In block 870, correlation/relationship module 356 determines whether the relevant features have been assigned to a training domain. Relevant features, as used herein, are those that have a direct effect on the overall steady state model of the target network. Accordingly, an irrelevant feature would be a feature that has little or no effect on steady state of the target network. If there are relevant features that have not been assigned to a training domain, then correlation/relationship process 800 returns to block 855. If all relevant features have been assigned to a training domain, correlation/relationship process ends.

As an example, a target network introduces Security Group Tags (SGTs), a Cisco specific method of labeling packets as the packets traverse the target network. SGTs, allow network devices to enforce policies based on the SGTs. While Cisco provides information regarding these SGTs through a new SNMP MIB (CISCO-TRUSTSEC-MIB) for monitoring purposes, the SGTs are effectively useless until in the target network environment.

In operation, the feature gathering system queries a switch in order to determine the switch's capabilities for providing information, such as all of the MIBs available through SNMP. The feature gathering system observes the new Trustsec MIBs, which include new information. Some of which pertain to SGTs. The feature gathering system analyzes the responses containing the new MIBs. In particular, the feature gathering system analyzes the responses to determine whether any of the values are changing, and, if so, by how much, intervals, size, etc. The feature gathering system uses this information to normalize new MIB. In this regard, the feature gathering system compares the new MIBs to information that is already known and well-understood, such as CPU usage, latency, buffers etc. Moreover, the feature gathering system observes how the data reacts over time while also observing things well understood. Accordingly, the feature gathering system determines if the new feature is a piece of time-series data (i.e., something that changes over time) or something that may have been statically set and does not change (i.e., the SGT numerical value, a name, a description, etc.). Based upon the analysis, the system determines how to classify and label the feature. For example, if the system learned the feature from a network device and can see the feature changing over time in manner consistent with other network related time-series data, the feature is classified as a network related time-series datum. If however the system learned the feature from a network device, but the value of the feature changes when logs indicate a user intervention (i.e. a configuration change) and the system notices a significant but monotonic change in other major pieces of information (such as, a drop in network traffic through several ports on the switch), the system reasonably concludes that this feature modifies the behavior of the switch, and in this case is a security type of restriction.

According to further embodiments, the system will also observe new information to determine whether the new information is textual in nature, such as with log messages, Textual information may be converted to numerical values such that it can be analyzed using techniques, such as singular value decomposition or symbolic aggregation approximation. This is usually possible since log messages tend to be similar enough across platforms that the log messages can be represented numerically.

Figure 9:
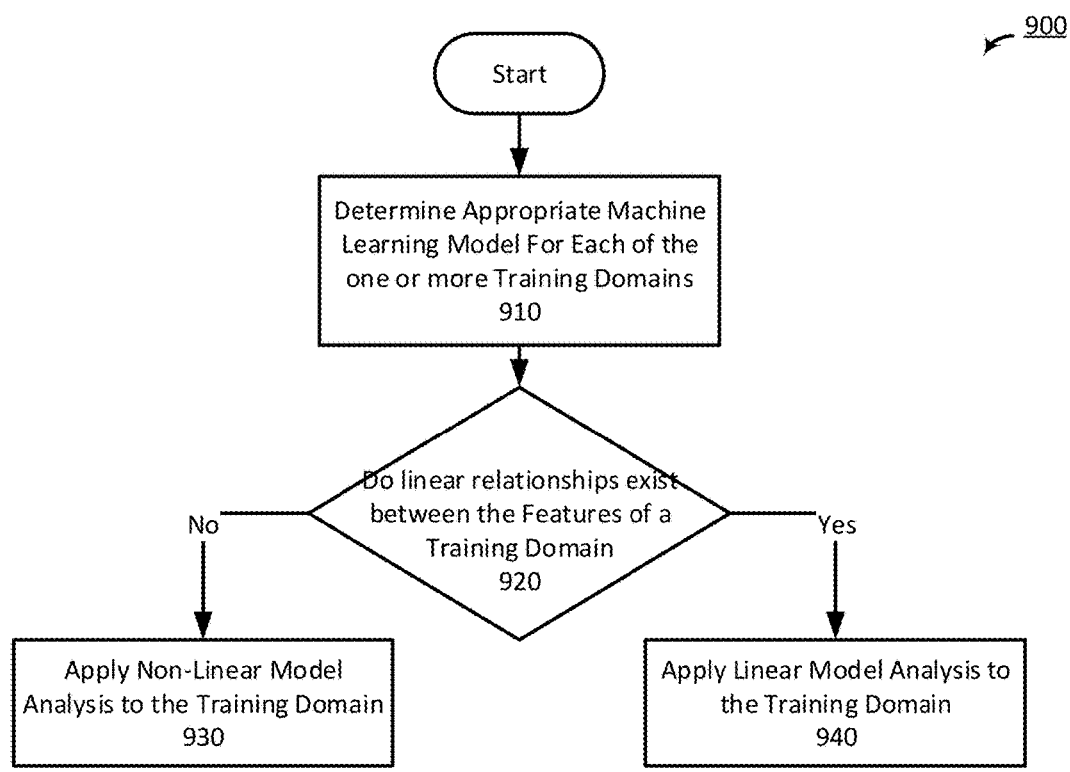
FIG. 9 illustrates an exemplary process for selecting training domain learning models from amongst a set of models.

After defining the correlation/relationship between various features, the NMLM system defines training domains. FIG. 9 illustrates a process 900 for defining a learning model for the training domains. In block 910, training domain module 358 determines the most appropriate machine learning model for each of the one or more training domains. In preferred embodiments, training domain module 358 begins with a linear regression model. The results of the linear regression model are compared to determine any deviations from the steady state model. Additionally, the results of the linear regression model are analyzed to determine whether certain features are clustered or whether the relationship between features models an nth degree polynomial. Known deviations from the linear model are compared to other machine learning models, such as non-linear, multiple linear, neural networks, Bayesian networks, decision trees, and the like. When the deviations are too great (e.g. >1 standard deviation), a proprietary model is used to detect deviations. Depending on the results from the various models, training domain module 358 selects the machine learning model that matches to the one or more training domains with the fewest or smallest deviations.

In block 920, training domain module 358 determines whether there are any linear relationships between features of a training domains. When there are non-linear relationships, training domain module 358 applies a non-linear model analysis to the features of the training domain in block 930. That is, a non-linear model analysis is used when the relationships between features are more complex or there are many different relationships involved. However, if there are linear relationships, and the relationships between features are simpler and more straightforward, then a linear machine learning model is applied to the features of the training domain in block 940.

Figure 10:
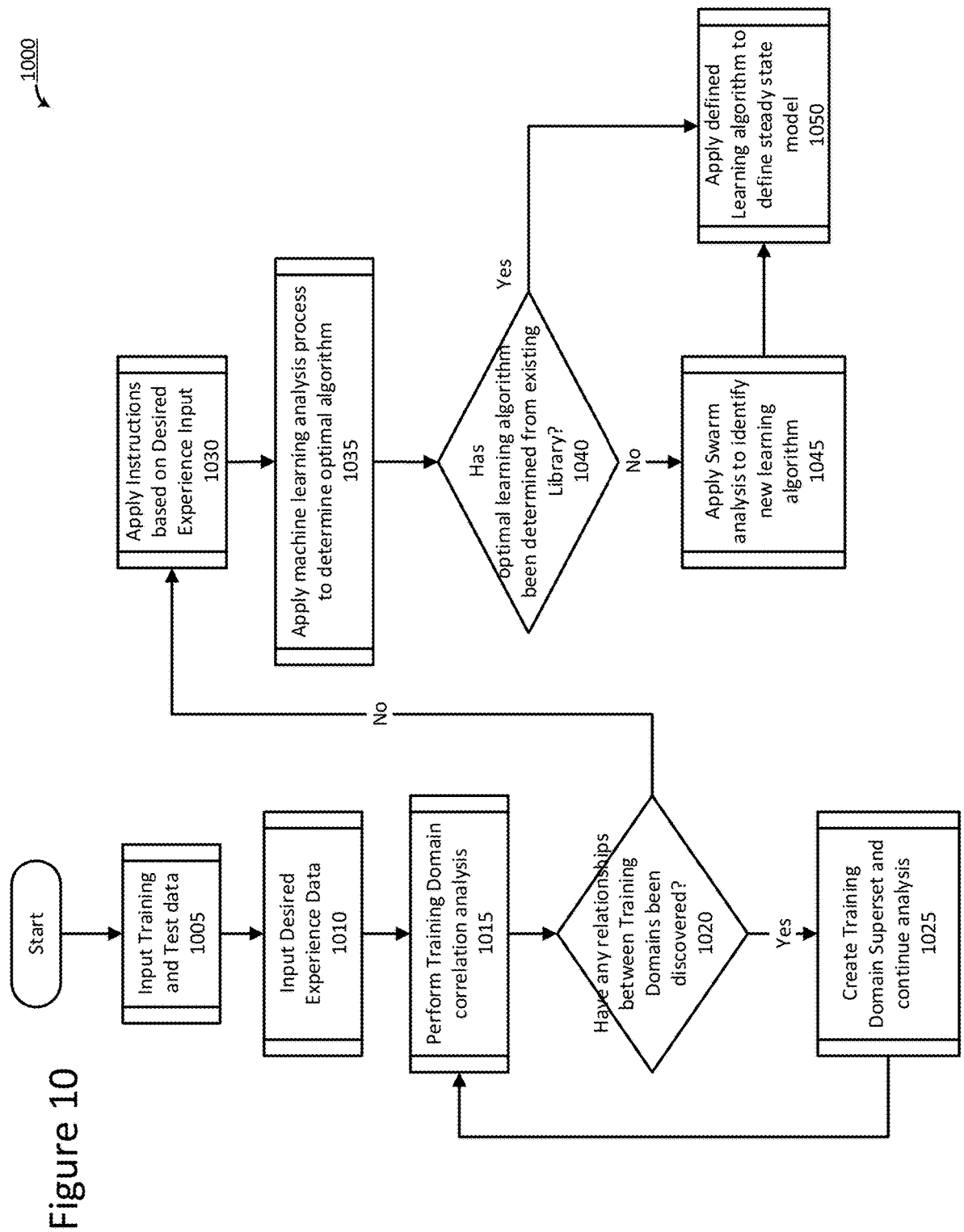
FIG. 10 illustrates a process for implementing a learning and training model according to one aspect of the disclosure.

Once an appropriate model is determined for each training domain, the appropriate model is stored and then sent on to the learning and training module for the creation of a steady state model for the computer network. FIG. 10 shows an exemplary process 1000 for deriving a steady state model of a target network by correlating relationships between at least one of a first training domain and a second training domain.

In block 1005, training data and test data from each of the training domains defined above are input into the learning and training module 360. In block 1010, desired experience data is inputted by a user. The desired experience data may define terms of service and quality levels for various features included in the network environment. In block 1015, correlation analysis is performed between the first training domain and the second training domain using the training and test data of both the first training domain and the second training domain, as well as the desired experience data. In block 1020, a determination is made as to whether any relationships exist between the first training domain and the second training domain. If new relationships are discovered, a new superset model is created from the first training domain and the second training domain and resubmitted to the correlation analysis engine in block 1025.

After interrelationships between the plurality of training domains have been discovered and superset models created, desired experience instructions are applied to the training domains and the superset models in block 1030. In block 1035, machine learning methods, such as regression, clustering, and others, are applied to the training domains and the superset models to determine the optimal algorithms to use for learning and training of the system. In preferred embodiments, the machine learning analysis includes using supervised, unsupervised, and reinforcement techniques in predefined libraries of algorithms. In block 1040, a determination is made as to whether the optimal learning algorithm has been determined from the predefined libraries of algorithms. If no optimal method of learning can be determined from the existing algorithms, machine learning techniques, such as swarm analysis, are used in block 1045 to identify new machine learning algorithms to be used for further training and learning. For instance, swarming optimizations may be used to mimic behaviors in the natural world. In the context of the present disclosure, an unknown features may swarm, or be grouped, with features and/or feature sets that appear to be closest to the unknown feature. The determination of which features are closest may be based on a statistical probability that the unknown feature is related to the feature and/or feature set based on values associated with both the unknown feature and the feature and/or feature set, such as lowest latency, lowest database query response time, etc. Since the system does not necessarily know what type of data has been input and how the data ultimately functions within the target network environment, behavioral analysis is used to allow system to identify the nature of the data, as well as the nature of the environment itself. Thus, the NMLM system is able to learn the devices, nodes, and components that constitute the target network, as well as determine the best models when discovering and learning about the target network. If one or more optimal algorithms are determined, a steady-state model is defined based on the one or more optimal algorithms in step 1050.

Figure 11:
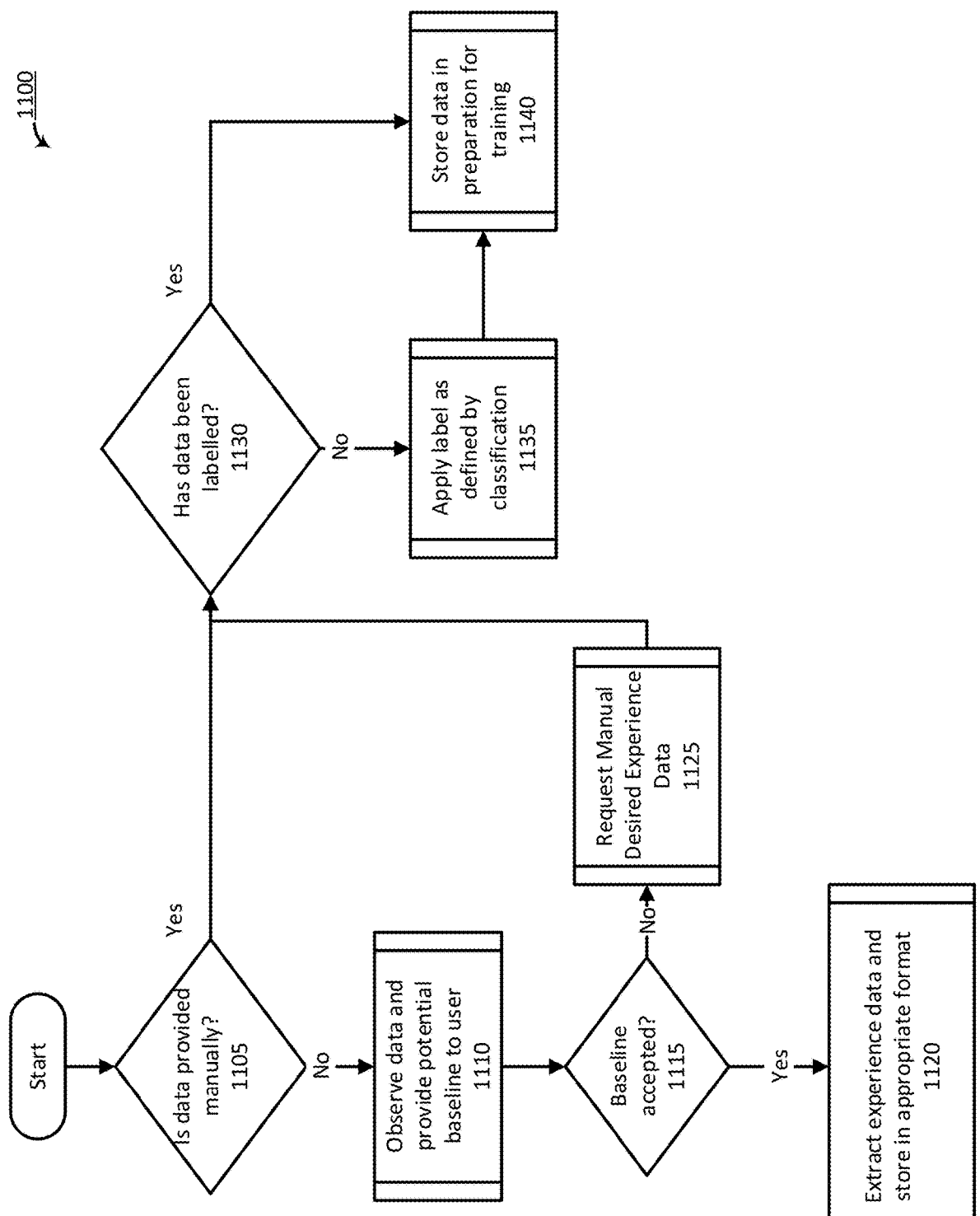
FIG. 11 illustrates a method for defining a desired experience according to one aspect of the disclosure.

As noted above, a user can define a desired experience for the network environment. FIG. 11 illustrates an exemplary process 1100 for inputting a desired user experience. User experience, as used herein, allows a user, such as an administrator, to define the components and interactions of the features and components of a network to define a baseline performance for the target network. For instance, the user may set a response time for a first application or define that a second application should have 99.999% uptime regardless of network failures. In block 1105, a determination is made whether user experience data has been entered manually. If the data has been inputted manually, the system determines if the data was entered with labels understood by the system in block 1130. If the data has been entered with labels, the data is stored and prepared for training in block 1140. If the data has not been labeled, the data is run through the classification and labeling process in block 1135 and stored in preparation for training in block 1140.

When the data has not been entered manually, the system observes behavior based on data and provides recommendations to the user for approval as a baseline for desired experiences in block 1110. In block 1115, the system determines if the recommended baseline for desired experiences is accepted. If the baseline is accepted, the experience recommendations are labeled and stored in preparation for training in block 1120. If the baseline recommendations are not accepted, the user is prompted to enter desired experience data manually in block 1125. Accordingly, the process continues as previously described with respect to blocks 1130-1140.

Figure 12:
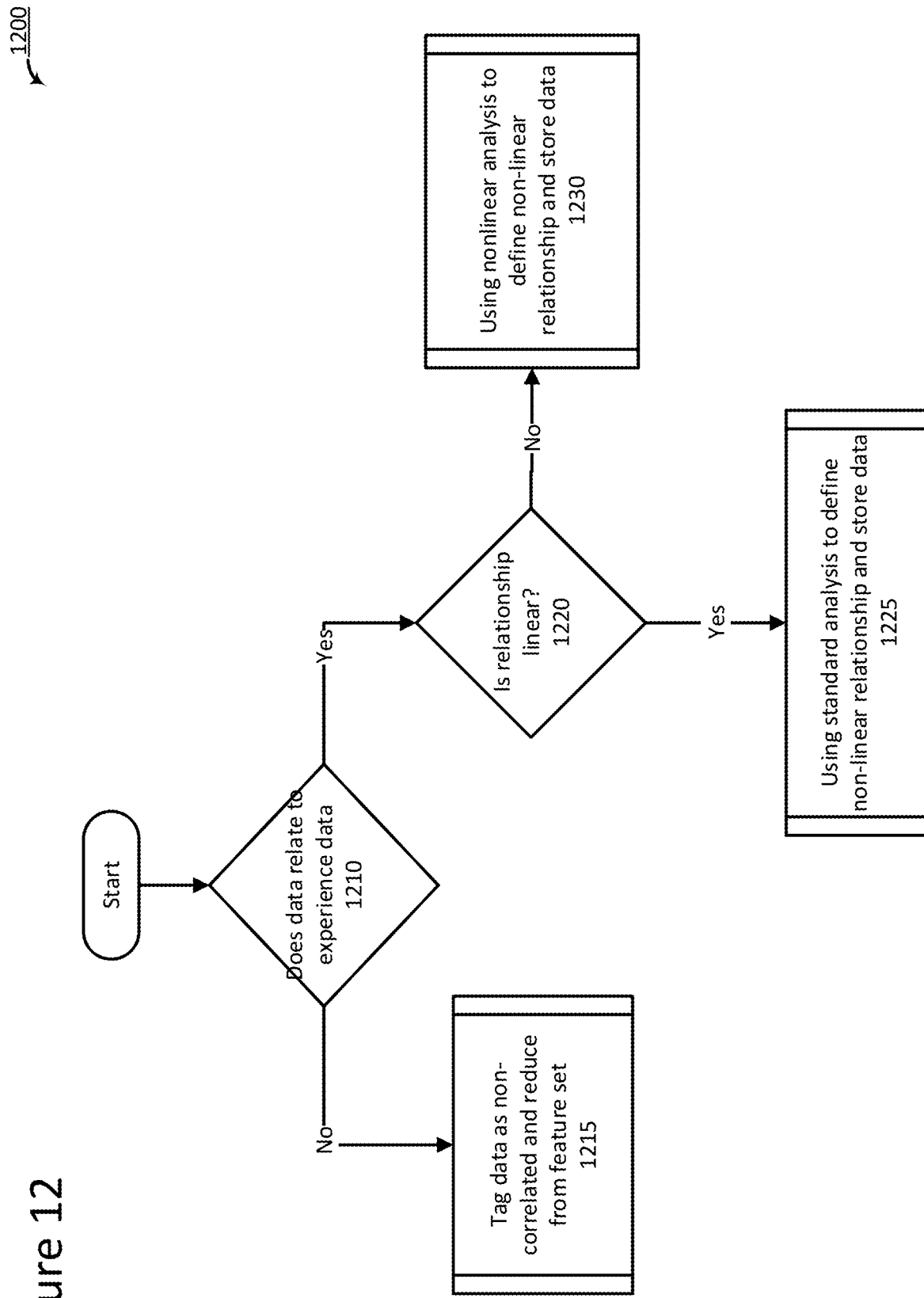
FIG. 12 shows a method for using the desired experience output to define baselines for classification and correlation methods.

Turning to FIG. 12, an exemplary process 1200 for utilizing desired experience data when defining baselines is shown. In block 1210, the NMLM system compares desired experience data against the input data to determine what, if any, relationship exists between the desired experience data and the input data. If there is no relationship between the desired experience data and the input data exists, then feature reduction analysis is performed and the input data is uncorrelated and reduced from the feature set in block 1215.

As discussed above, feature reduction removes one or more features from the model that do not contribute to the model performance.

However, if a relationship exists between the desired experience data and the input data, then NMLM system determines if the relationship is a linear or non-linear relationship in block 1220. If the relationship is linear, then standard analysis techniques are applied to the input data for training and the resulting data is stored in block 1225. When there is a non-linear relationship, standard analysis techniques are used to define the non-linear relationship, which is stored in memory in block 1230. The resulting data is used by the training and learning module for building the optimal baseline which is considered the final steady-state model. Moreover, the resulting data set may also be used during the statistical control process described below to identify deviations from optimal behavior and to identify which training domains and specific features are at issue.

Figure 13:
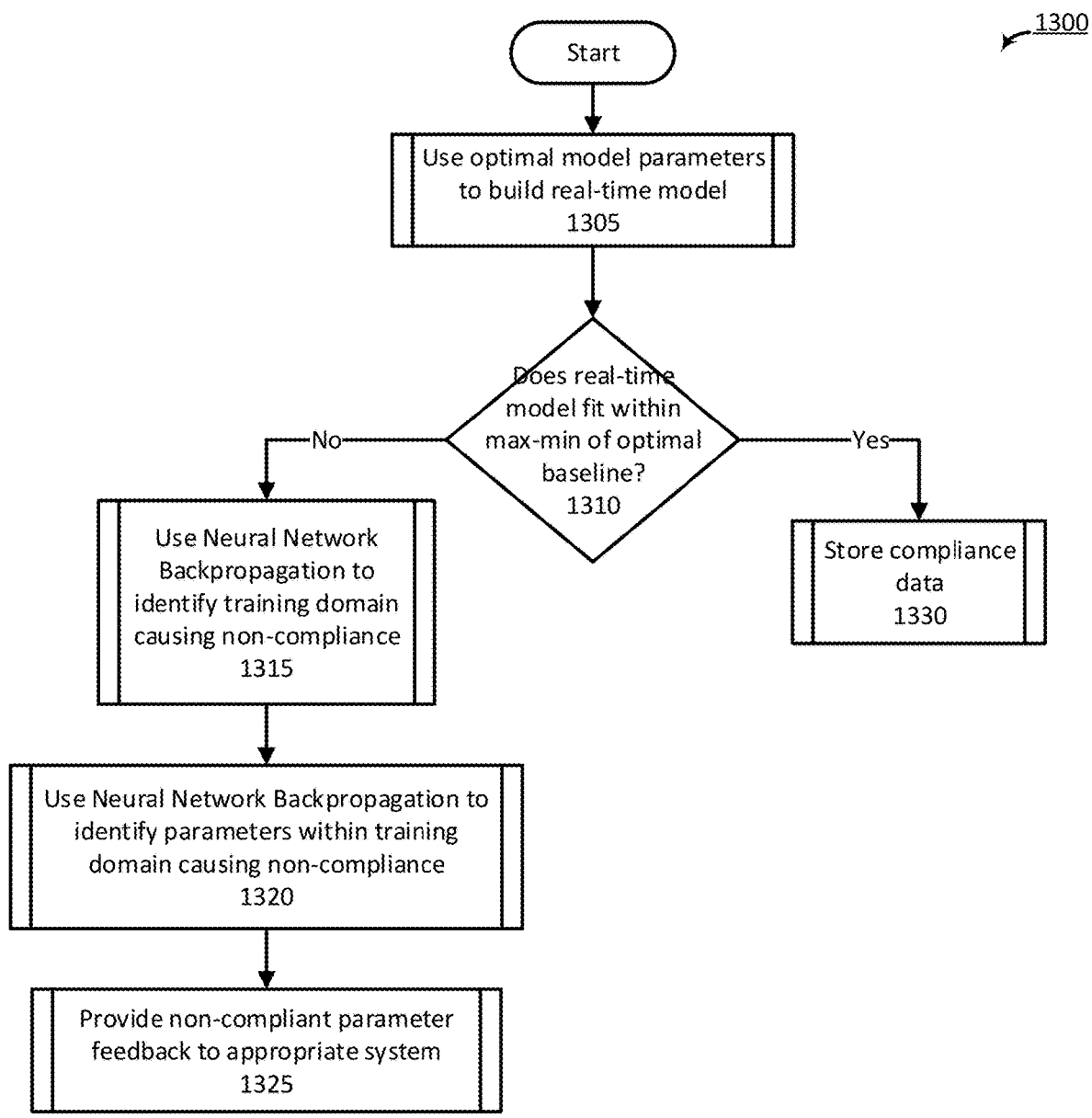
FIG. 13 illustrates a process for assessing deviation from baseline configuration according to another aspect of the disclosure.

After the training domains and steady-state model are configured, the NMLM system uses the training domains and steady state model to detect and predict deviations of the target network from the steady state model in the baseline comparison module 362. FIG. 13 shows a process 1300 for identifying deviations from the steady-state model.

In block 1305, a real-time model is built from features that are continuously sent or retrieved from each node in the system. The real-time model is then compared to the steady-state model. In block 1310, the NMLM system determines whether the real-time model fits within the ranges defined in the steady-state model. In preferred embodiments, determining whether the real-time model fits within the ranges defined in the steady-state model includes comparing each feature to the corresponding feature in the steady state model to ensure that the feature falls within its maximum and minimum threshold values.

If the real-time model does not fit within the ranges defined in the steady-state model, neural network back propagation of errors ("neural network backpropagation") is used to identify the non-compliant training domain in block 1315. Furthermore, neural network backpropagation may be used to determine the root cause of the non-compliant training domain by identifying specific features that are causing the non-compliance in block 1320. In some embodiments, the neural network backpropagation is able to obtain a labeled identity of the feature causing the deviation from the steady-state model. In block 1325, the non-compliant information is fed back into the appropriate system to modify the node or nodes causing the deviation from the steady-state model. Modifying the node or nodes may include manual or automatic intervention. This process may be repeated for each training domain identified as deviating from the steady-state model. According to some embodiments, features that appear in multiple domains are identified and acted upon only once. If the real-time model does fit within the thresholds of the steady-state model, the compliance data is stored in block 1330 to be used as a reference point for long-term trending and predictive modeling.

Figure 14:
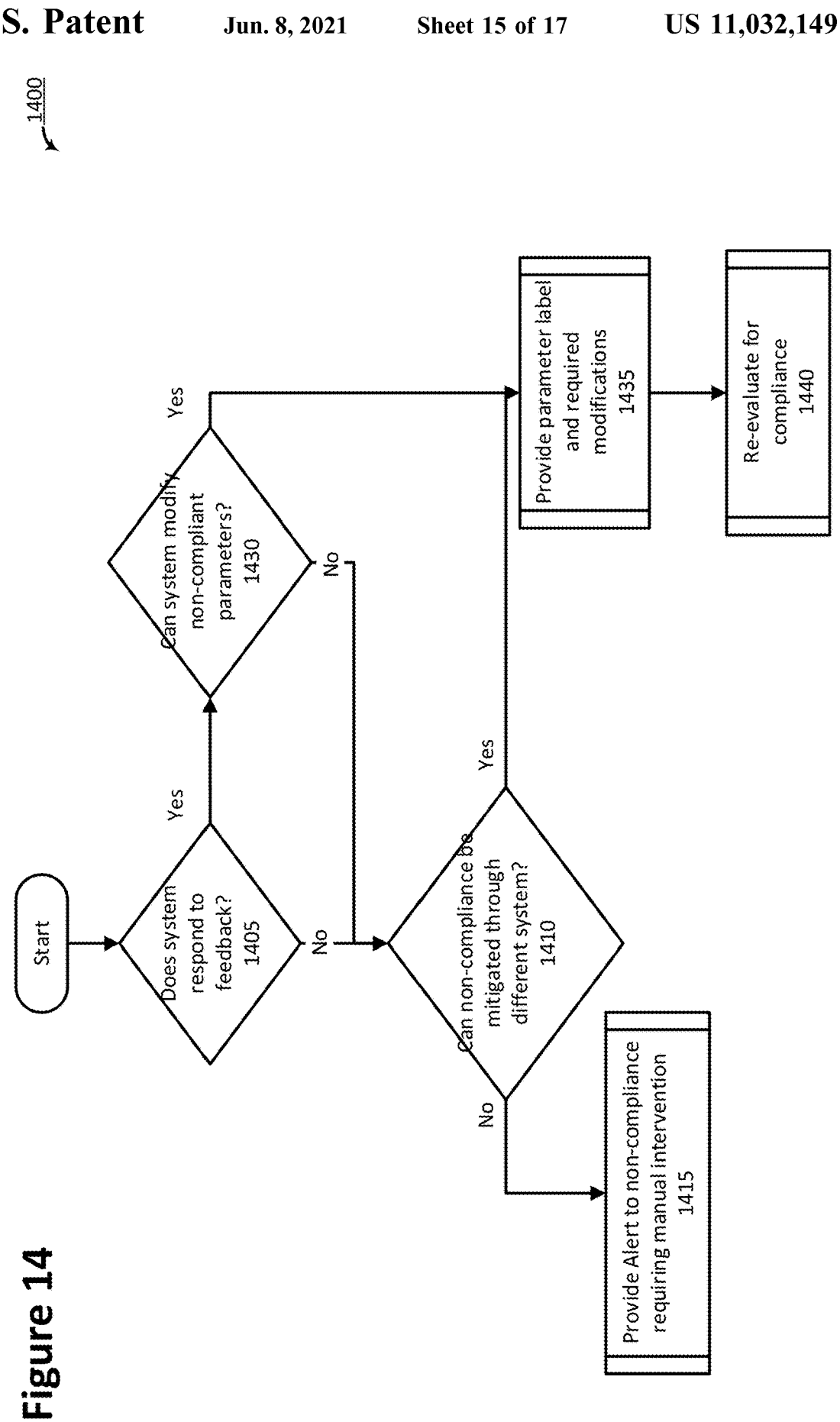
FIG. 14 illustrates a method of providing feedback to a learning machine based on results from an assessment.

Turning to FIG. 14, a process 1400 for providing feedback to the appropriate system is shown. In block 1405, a determination is made whether a deviant node will accept feedback, either directly or indirectly. If the node is capable of accepting feedback, then the system determines if it can modify one or more non-compliant parameters in block 1430. If the system can modify the one or more non-compliant parameters, the parameter label and required modifications are provided directly to the node in block 1435. After the modifications have been made, the node with the updated feature data is re-evaluated to ensure compliance with the steady state model in block 1440. The re-evaluation includes deriving a new real-time model with the updated feature and comparing the new real-time model to the previously defined steady state model. However, if the node is still non-compliant after receiving the required modifications, then process 1400 is repeated until compliance is met.

If the node cannot accept direct feedback, process 1400 proceeds to block 1410 where a determination is made as to whether the node can be mitigated through a different system. For example, data may be re-routed around a non-compliant node. If the non-compliant node can be mitigated through a different system or an adjacent node, the parameter label and required modifications are provided directly to the adjacent node in block 1435. After the modifications have been made, the node with the updated feature data is re-evaluated to ensure compliance with the steady state model in block 1440. As noted above, re-evaluation includes deriving a new real-time model with the updated feature and comparing the new real-time model to the previously defined steady state model. However, if the node is still non-compliant after receiving the required modifications, then process 1400 is repeated until compliance is achieved.

If no nodes or systems can act upon the non-compliance data, alerts will be sent to users for manual intervention in block 1415. These alerts can be sent via multiple means, including email, pager duty notifications, text messages, web interfaces, or graphical based monitoring systems.

Figure 15:
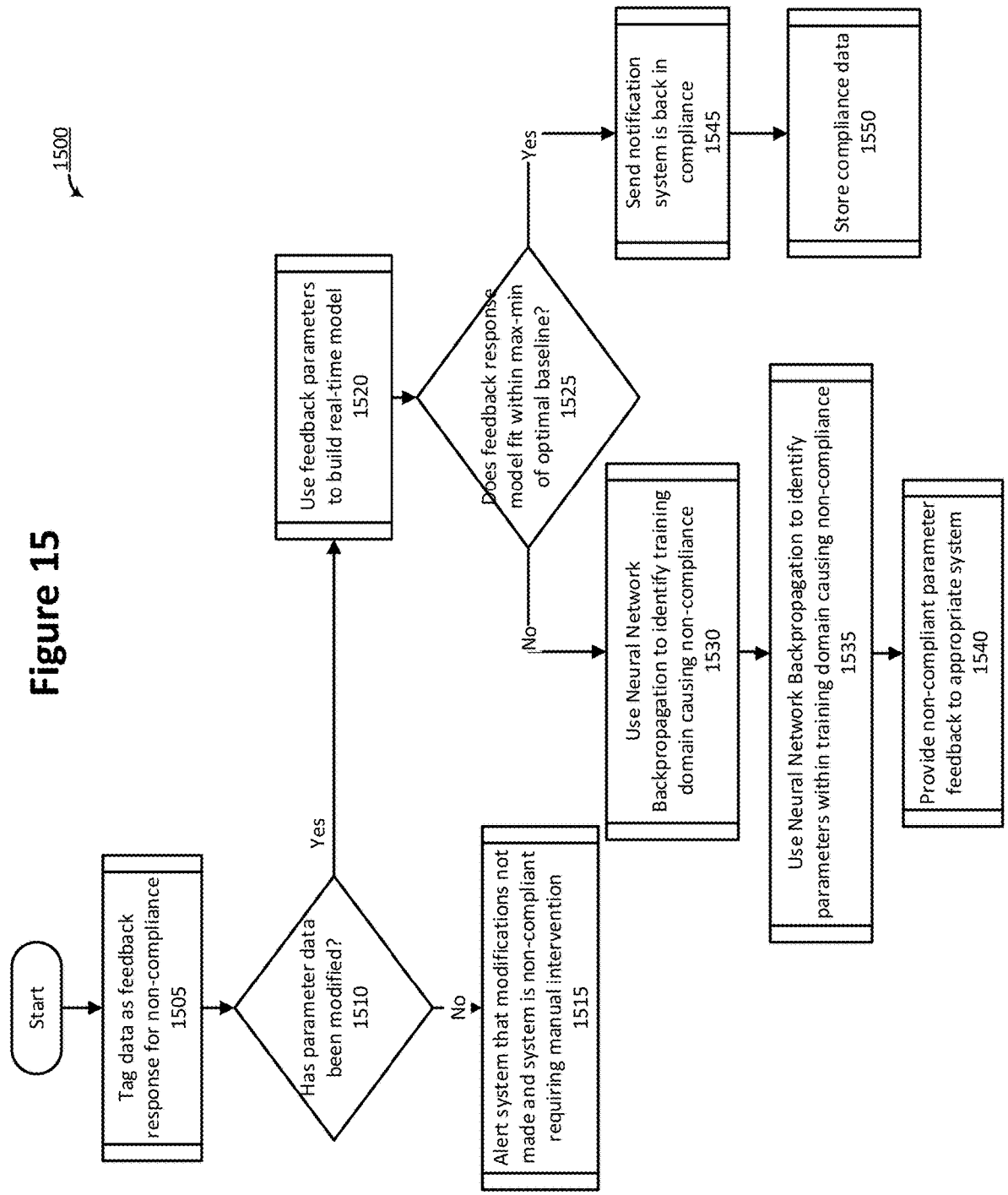
FIG. 15 illustrates a method for incorporating feedback response a network assessment.

FIG. 15 shows a statistical process control method 1500 for incorporating feedback response into baseline comparison module 362 so that re-evaluation of deviant nodes can occur. Since the identified deviation from baseline may be identified before it actually occurs, the re-evaluation process uses a simulation approach in conjunction with neural network techniques, such as deep or convolutional neural networks to predictively model the future state of the target network for compliance. For example, if CPU utilization has trended up for the past 10 minutes, the NMLM system will continue to increase CPU usage while modifying other features in the domain based on their relationship to CPU usage to identify the feature or group of features that are causing the overall deviation from baseline.

In block 1505, feedback response data is received by the system and tagged as feedback response for a non-compliant node. In block 1510, the NMLM system identifies one or more features that were modified. If no features were modified, the system sends out alerts to users for manual intervention in block 1515.

However, if one or more features have been modified, process 1500 proceeds to block 1520, where the feedback data that has been modified to address non-compliance are used to build a new real-time model. In block 1525, the system determines if the model created from the feedback response fits within the ranges defined in the steady state model. If the resultant model is compliant, a response is sent back to the node or nodes in question to confirm compliance in block 1545. Furthermore, the information is stored for long-term trending analysis and other predictive modeling processes in block 1550.

If the new model is still non-compliant, neural network back propagation is used to identify the non-compliant training domain in block 1530. Furthermore, neural network backpropagation may be used to determine the root cause of the non-compliant training domain by identifying specific features that are causing the non-compliance in block 1535. In some embodiments, the neural network backpropagation may be able to obtain a labeled identity of the feature causing the deviation from the steady state baseline model. In block 1540, the non-compliant information is fed back into the appropriate system to modify the node or nodes causing the deviation from the steady state baseline model.

Figure 16:
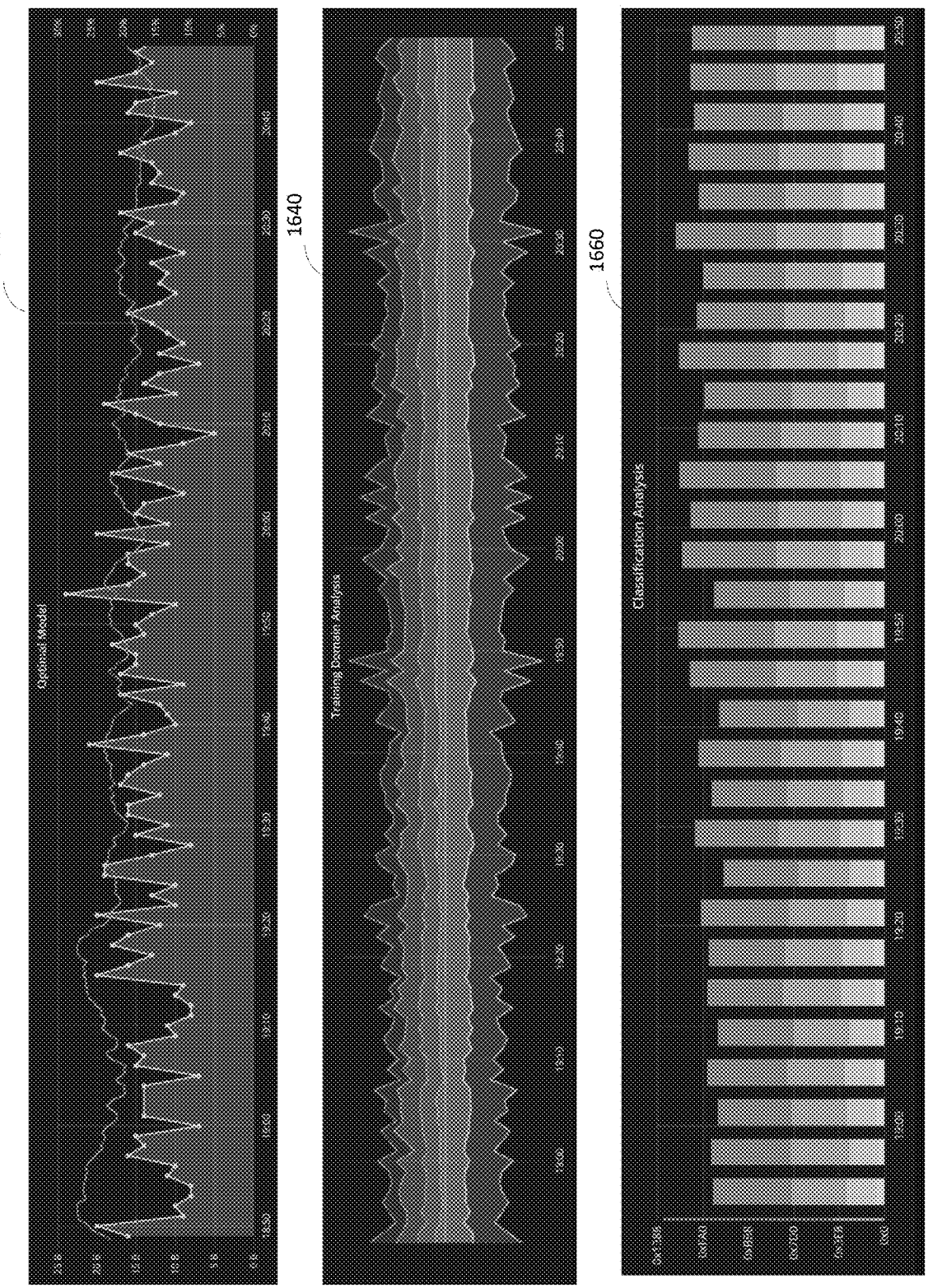
FIG. 16 shows one example of displaying the steady state network model, training domain analysis, and classification analysis results.

Turning to FIG. 16, a graphical representation 1600 showing an example of real-time monitoring is shown. In this regard, graphical representation 1600 may include an steady-state model 1620, training domain creation and evaluation 1640, and classification analysis 1660. Since the data is primarily time-series in nature, the data can easily be represented and presented in numerous ways.

Unless otherwise stated, the foregoing alternative embodiments are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the embodiments described herein, as well as clauses phrased as "such as," "including," and the like, should not be interpreted as limiting the subject matter of the claims to the specific embodiments; rather, the embodiments are intended to illustrate only one of many possible embodiments.

What is claimed is:

1. A method for managing a first network, the method comprising:

obtaining, at a first server, one or more features from the first network;

classifying and labelling the one or more features obtained from the first network;

defining, using the classified and labelled one or more features, a first training domain, wherein the first training domain comprises a first feature associated with a first measurable property and a second feature associated with a second measurable property different from the first measurable property;

creating, by the first server, a first steady state model of the first network using, in part, the first training domain;

monitoring, by the first server, the first network by comparing a first current state model to the first steady state model;

determining that the first feature is causing the first current state model of the first network to deviate from the first steady state model;

determining, by the first server, whether the first feature is capable of accepting direct feedback; and remediating the second feature to bring the first network into compliance with the first steady state model based on a determination that the first feature is not capable of accepting direct feedback, wherein the first training domain identifies a relationship between the first feature and the second feature.

2. The method of claim 1, wherein obtaining one or more features from the first network further comprises:

transmitting, from the first server, a first request for information to one or more first devices;

receiving, at the first server, a first response to the first request for information from one or more first devices;

analyzing, by the first server, first network traffic between at least one second device and one third device;

determining, by the first server, the one or more features of the first network using at least one of the first response and the analysis of the first network traffic; and creating, by the first server, a first configuration of the first network based, in part, on the one or more features.

3. The method of claim 2, wherein analyzing the first network traffic further comprises:

inspecting, by the first server, one or more packets exchanged between the second device and the third device;

determining, by the first server, a classification for the first network traffic; and monitoring, by the first server, whether the classification for the first network traffic is permitted to traverse the first network between the second device and third device.

4. The method of claim 2, further comprising:

updating, by the first server, the first configuration of the first network based on further monitoring of the first network.

5. The method of claim 1, wherein the determining that the first feature is causing the first current state model of the first network to deviate from the first steady state model further comprises:

identifying one or more training domains that are non-compliant when the first network does not comport to baseline configuration parameters; and identifying the first feature within the one or more non-compliant training domains.

6. The method of claim 1, wherein the first current state model of the first network is defined using one or more optimal machine learning algorithms.

7. The method of claim 5, wherein the one or more non-compliant training domains are identified using neural network back propagation.

8. The method of claim 5, wherein the first feature is identified using neural network back propagation.

9. The method of claim 1, further comprising:

determining whether the first network has returned to the first steady state model in response to remediating the second feature by comparing a second current state model to the first steady state model.

10. The method of claim 9, further comprising:

determining additional remedial action to correct the first feature when the first network has not returned to the first steady state model.

11. The method of claim 1, wherein classifying and labelling the one or more features obtained from the first network further comprises:

determining, by the first server, whether the one or more features associated with the first network have been classified;

when the one or more features associated with the first network have been classified, determining whether the one or more features have been labelled; and in response to determining that the one or more features have been labelled, storing the one or more labelled features in a memory.

12. The method of claim 11, further comprising:

determining an appropriate label for the one or more features when the one or more features have not been labelled; and applying the appropriate label to the one or more features.

13. The method of claim 11 further comprising:

determining an appropriate classification for the one or more features when the one or more features have not been classified; and applying the appropriate classification to the one or more features.

14. The method of claim 13, wherein determining an appropriate classification for the one or more features further comprises:

determining, by the first server, an optimal operating range for the one or more features;

querying, by the first server, one or more devices with respect to the one or more features to obtain additional information;

receiving, at the first server, additional information from the one or more devices about the one or more features;

storing, at the first server, the additional information received from the one or more devices; and applying a classification to the one or more features based, in part, on the additional information.

15. The method of claim 1, wherein defining the first training domain further comprises:

extracting the first feature and the second feature from the one or more features obtained from the first network;

determining that a relationship exists between the first feature and the second feature based on a determination that a behavior of the first feature changes in response to the second feature being modified.

16. The method of claim 15, further comprising:

assigning the first feature and the second feature to the first training domain when the second feature impacts the first feature.

17. The method of claim 1, wherein creating the first steady state model further comprises:

determining whether a relationship exists between the first training domain and a second training domain;

combining the first training domain and the second training domain into a superset domain when a relationship exists between the first training domain and the second training domain;

determining an optimal machine learning algorithm for a plurality of training domains and the superset domain; and defining, by the first server, the first steady state model of the first network using at least one of the plurality of training domains and the superset domain.

18. A method for configuring and optimizing a computer network, the method comprising:

receiving, at a first server, at least one input variable related to the computer network, wherein the at least one input variable is undefined;

classifying, by the first server, the at least one input variable using at least one of a supervised learning approach or an unsupervised learning approach;

building, by the first server and using the at least one classified input variable, a first training domain, wherein the first training domain identifies a relationship between an element and one or more sensors monitoring the computer network based on a correlation between a first measurable property and a second measurable property different from the first measurable property;

determining, by the first server, a first steady state network configuration for the computer network;

receiving, at the first server, a plurality of second inputs from the one or more sensors monitoring the computer network;

comparing, by the first server, the plurality of second inputs to the first steady state network configuration to detect a deviation from the first steady state network configuration; and sending, by the first server and to the element of the computer network, one or more instructions to remediate a cause of the deviation.

19. The method of claim 18, further comprising:

classifying, by the first server, the plurality of second inputs to allow identification of relevant features;

labelling, by the first server, the plurality of second inputs to allow identification of relevant features; and defining, by the first server, a maximum threshold for each of the plurality of second inputs to allow identification of relevant features.

20. The method of claim 18, further comprising:

creating, by the first server, one or more training domains from common groups of related data; and creating an optimal mathematical model by applying one or more machine learning algorithms to the one or more training domains.

21. The method of claim 20, further comprising:

creating an optimal mathematical model for supersets of training domains using machine learning methods; and creating a single mathematical model from the one or more training domains using machine learning methods.

22. The method of claim 18, further comprising:

determining a steady-state model for a training system using machine learning techniques; and learning behavior in real-time using machine learning techniques to predict future state models.

23. The method of claim 18, further comprising:

providing, by the first server, a notification to a first user of the deviation from the first steady state network configuration.

24. The method of claim 18, further comprising:

maintaining maximum and minimum thresholds for a steady state model using statistical control processes.

25. The method of claim 18, further comprising:

comparing, by the first server, real-time and steady state models through statistical control processes;

identifying, by the first server, one or more non-compliant training domains using neural networks; and identifying, by the first server, non-compliant features within one or more training domains using neural networks.

26. The method of claim 18, further comprising:

providing, by the first server, to a plurality of second systems, feedback related to non-compliance with steady-state; and receiving, by the first server, from a plurality of second systems, response to feedback related to compliance with steady-state.

27. The method of claim 18, further comprising:

presenting data input, manipulated and stored by the first server and a plurality of second systems in storage mediums via mobile or graphical representations of data.

\* \* \* \* \*